United States Patent
Xu et al.

(10) Patent No.: US 12,406,520 B2
(45) Date of Patent: Sep. 2, 2025

(54) INTERACTION METHOD FOR ELECTRONIC DEVICE FOR SKIN DETECTION, AND ELECTRONIC DEVICE

(71) Applicant: Huawei Technologies Co., Ltd., Shenzhen (CN)

(72) Inventors: Han Xu, Shenzhen (CN); Xuezhi Zhao, Shanghai (CN); Xian Ding, Shenzhen (CN); Wenmei Gao, Shenzhen (CN)

(73) Assignee: HUAWEI TECHONLOGIES CO., LTD., Shenzhen (CN)

( * ) Notice: Subject to any disclaimer, the term of this patent is extended or adjusted under 35 U.S.C. 154(b) by 471 days.

(21) Appl. No.: 17/927,580

(22) PCT Filed: May 26, 2021

(86) PCT No.: PCT/CN2021/096113
§ 371 (c)(1),
(2) Date: Nov. 23, 2022

(87) PCT Pub. No.: WO2021/238995
PCT Pub. Date: Dec. 2, 2021

(65) Prior Publication Data
US 2023/0215208 A1    Jul. 6, 2023

(30) Foreign Application Priority Data
May 27, 2020 (CN) .......................... 202010459215.5

(51) Int. Cl.
*G06V 40/10* (2022.01)
*G06V 40/16* (2022.01)

(52) U.S. Cl.
CPC .......... *G06V 40/10* (2022.01); *G06T 2207/10* (2013.01); *G06V 40/171* (2022.01)

(58) Field of Classification Search
CPC ......... G06F 3/017; G06F 3/011; G06V 40/28; G06V 40/107; G06V 40/113; G06V 40/16–171
See application file for complete search history.

(56) References Cited

U.S. PATENT DOCUMENTS

| | | | |
|---|---|---|---|
| 2015/0130846 A1* | 5/2015 | Asano ................ | H04N 21/4318 345/661 |
| 2015/0248581 A1* | 9/2015 | Gouda .................. | G06T 19/006 345/633 |
| 2016/0042224 A1 | 2/2016 | Liu et al. | |

(Continued)

FOREIGN PATENT DOCUMENTS

| | | |
|---|---|---|
| CN | 104299011 A | 1/2015 |
| CN | 105574484 A | 5/2016 |

(Continued)

*Primary Examiner* — Raphael Schwartz
(74) *Attorney, Agent, or Firm* — Conley Rose, P.C.

(57) ABSTRACT

An interaction method for an electronic device for skin detection includes recognizing a hand action and a face of a user to determine a target hand action; determining a detection target corresponding to the hand action based on the target hand action; determining from an extended content library based on the detection target and a shape of the detection target, extended content associated with the detection target and the shape of the detection target, and outputting the extended content.

18 Claims, 18 Drawing Sheets

(56) References Cited

U.S. PATENT DOCUMENTS

| | | |
|---|---|---|
| 2016/0125228 A1 | 5/2016 | Son et al. |
| 2016/0224825 A1 | 8/2016 | Tomita et al. |
| 2017/0340267 A1 | 11/2017 | Shen et al. |
| 2018/0199856 A1 | 7/2018 | Tiwari et al. |
| 2021/0090337 A1* | 3/2021 | Ravasz ................ G06T 19/006 |
| 2022/0148161 A1 | 5/2022 | Guo et al. |
| 2023/0215208 A1 | 7/2023 | Xu et al. |

FOREIGN PATENT DOCUMENTS

| | | |
|---|---|---|
| CN | 106095088 A | 11/2016 |
| CN | 107111861 A | 8/2017 |
| CN | 108062400 A | 5/2018 |
| CN | 108354587 A | 8/2018 |
| CN | 109793498 A | 5/2019 |
| CN | 110477868 A | 11/2019 |
| CN | 111651040 A | 9/2020 |

* cited by examiner

Point to a pimple    Point to a stain    Point to a wrinkle    Point to a nose

Point to a pimple    Point to a stain    Point to a wrinkle    Point to an eyebrow

| | | | |
|---|---|---|---|
| Grade I acne | There is mainly a comedo and a small amount of papule nodules, and a total quantity of skin lesions is less than 30 | | |
| Grade II acne | There is a comedo and a medium amount of papule and pustules, and a total quantity of skin lesions is 31 to 50 | | |
| Grade III acne | There is a large quantity of papule and pustules, and a total quantity of skin lesions is 50 to 100 | | |
| Grade IV acne | There is nodular/cystic acne or aggregated acne, a total quantity of skin lesions is greater than 100, and a quantity of nodules/cysts is greater than 3 | | |

FIG. 10a

INTERACTION METHOD FOR ELECTRONIC DEVICE FOR SKIN DETECTION, AND ELECTRONIC DEVICE

CROSS-REFERENCE TO RELATED APPLICATIONS

This is a U.S. National Stage of International Patent Application No. PCT/CN2021/096113 filed on May 26, 2021, which claims priority to Chinese Patent Application No. 202010459215.5 filed on May 27, 2020. Both of the aforementioned applications are hereby incorporated by reference in their entireties.

TECHNICAL FIELD

This application relates to the field of software application technologies, and in particular, to an interaction method for an electronic device for skin detection, and an electronic device.

BACKGROUND

Currently, some products that perform skin detection based on an image technology exist in the market, and these products analyze a skin state of a user by detecting an image of the user, to provide better experience for a customer. However, an existing skin detection product needs to perform comprehensive detection on an entire skin in an obtained image. After a detection result is obtained, the user needs to enter a specified functional page to view an analysis result. For example, if the user wants to view a skin color, the user taps a function option of the skin color, to enter a skin color analysis page to view a skin color result. The customer needs to perform a single-machine operation on the product for a plurality of times, and the operation is cumbersome. Some existing products further require an additional hardware accessory, for example, a beauty detector. During operation of the hardware accessory, a skin problem region may be touched, leading to bacteria spread and cross infection. In another application of the existing product, the user needs to manually select a skin care/makeup product or a makeup skill. In a makeup process, it is inconvenient for two hands of the user to touch a screen to perform a selection operation.

SUMMARY

In view of this, this application provides an interaction method for an electronic device for skin detection, and an electronic device, so that a gesture of a user and an intention indicated by the gesture can be accurately recognized based on a real-time image of the user in a skin care or makeup process, and skin state information corresponding to the gesture and a skin care or makeup processing suggestion are provided. In this way, an interaction process is more natural and smoother, and user experience is improved.

Some implementations of this application provide an interaction method for an electronic device for skin detection. The following describes this application from a plurality of aspects. For implementations and beneficial effects of the plurality of aspects, refer to each other.

According to a first aspect, this application provides an interaction method for an electronic device for skin detection, applied to an electronic device. The method includes: obtaining a plurality of video frames including both a face and a hand of a user, for example, a real-time image of the user; recognizing an action of the hand of the user relative to the face in the plurality of video frames, and determining a target hand action: determining a detection target in at least some regions on the face of the user in the video frame in response to the target hand action, where the detection target may include one or more of a pimple, a fine line, a pore, a blackhead, acne, a plaque, redness, a nose, a mouth, an eye, an eyebrow, a facial contour, a skin color, and the like; and determining, from an extended content library based on the detection target and a shape of the detection target (for example, a shape of the eyebrow is a crescent shape or a splayed shape), extended content associated with the detection target and the shape of the detection target, and outputting extended content. The extended content may include: one or more of a problem analysis and a care suggestion of the detection target in a skin care state, or one or more of a makeup state analysis and a makeup suggestion of the detection target in a makeup state. In this embodiment of this application, a gesture of the user and an intention indicated by the gesture can be accurately recognized based on a real-time image of the user in a skin care or makeup process, and skin state information corresponding to the gesture and a skin care or makeup processing suggestion are provided. In this way, an interaction process between the user and the device is more natural and smoother, and user experience is improved In a possible implementation of the first aspect, the determining a target hand action includes: The electronic device determines a hand action as the target hand action when determining that a distance between a location at which a fingertip of a finger is located and a location at which the face is located in the video frame is less than a preset distance. The hand action is determined as a target action by determining a distance between the finger and the face, to avoid a case in which some unnecessary gestures are incorrectly recognized and the intention of the user is wrongly determined In a possible implementation of the first aspect, the determining a target hand action includes: determining a hand action as the target hand action when determining that a distance between a location at which a fingertip of a finger is located and a location at which the face is located in the video frame is less than a preset distance, and determining that duration in which the finger is still relative to the face in the video frame is greater than a preset time period. Accuracy of determining the intention of the user based on the gesture is further improved.

In a possible implementation of the first aspect, the determining a target hand action includes: determining that a video includes two hands; and determining a hand action as the target hand action when determining that a distance between a location at which fingertips of fingers of the two hands are located and a location at which the face is located in the video frame is less than a preset distance, and determining that duration in which the fingers of the two hands are still relative to the face in the video frame is greater than a preset time period.

In a possible implementation of the first aspect, when an amplitude of a relative motion of the finger relative to the face is less than a preset value, it is determined that the fingers of the two hands are still relative to the face in the video frame. Gesture determining accuracy can be improved In a possible implementation of the first aspect, that the electronic device determines that a distance between a location at which the finger is located and the location at which the face is located in the video frame is less than the preset distance includes: a region of the location at which the finger of the user is located overlaps a region of the location at which the face is located in the video frame; or the finger does not overlap the face in the video frame, but a distance between the fingertip of the finger and an edge point that is of the face and that is closest to the fingertip of the finger is less than the preset distance.

In a possible implementation of the first aspect, that the electronic device determines a detection target in at least some regions on the face of the user in the video frame in response to the target hand action includes: determining, from at least one of the plurality of video frames, an intersection region between a region to which the finger points in the target hand action and a region in which the face is located, and determining the detection target in the intersection region. The detection target in the intersection region is determined, so that the user can directly find the detection target based on a direction to which the finger points, to help the user have an intuitive and natural feeling, and improve interaction experience of the user In a possible implementation of the first aspect, the region to which the finger points is a geometric shape determined by using the fingertip of the finger as a reference point and by using, as a reference direction, a direction to which the finger points, and the geometric shape has a size and a contour that are preset by the user.

In a possible implementation of the first aspect, when it is determined that the video includes the two hands, the region to which the finger points is a geometric shape determined by using the fingertip of the finger as a reference point and by using, as a reference direction, a direction to which the finger points, and the geometric shape is a geometric shape preset by the user. An intersection set or a union set of regions to which the fingers of the two hands point is used as the region to which the finger points.

In a possible implementation of the first aspect, the geometric shape includes any one of a trapezoid, a sector, a triangle, a circle, and a square.

In a possible implementation of the first aspect, the face includes at least one preset ROI region; and that the electronic device determines a detection target in at least some regions on the face of the user in the video frame in response to the target hand action further includes, determining, from the at least one of the plurality of video frames, an intersection region between the region to which the finger points in the target hand action and the ROI region included on the face, and determining the detection target in the intersection region. The ROI region may include a forehead, a nasal bridge, a philtrum, a chin, cheeks, an under-eye region, a risorius muscle, or the like. The detection target is determined from the intersection region between the direction to which the finger points and the ROI region on the face of the user, so that a specified region of the user is analyzed with reference to the ROI region on the face, to improve accuracy of analyzing the detection target by the electronic device, and improve an interest of interaction.

In a possible implementation of the first aspect, when it is determined that the intersection region covers at least two ROI regions, the detection target is determined from an ROI region with a largest area in the intersection region.

In a possible implementation of the first aspect, when it is determined that the intersection region covers at least two ROI regions, one ROI region is selected based on a preset priority of the ROI region and/or a matching degree between a detection target in the ROI region and a feature standard model corresponding to the detection target, and the detection target is determined from the selected ROI region.

In a possible implementation of the first aspect, when it is determined that the intersection region covers at least two ROI regions, the method further includes: The electronic device determines the detection target based on a first operation performed by the user on a detection target in the ROI region. The user may directly determine the detection target through tapping, or the like based on an observation result of the user, so that the user can select the detection target based on a subjective opinion of the user, to improve interaction experience of the user.

In a possible implementation of the first aspect, the detection target includes one or more skin states of a pimple, a fine line, a pore, a blackhead, acne, a plaque, and redness, or the detection target includes one or more of a nose, a mouth, an eye, an eyebrow, a facial contour, and a skin color.

In a possible implementation of the first aspect, the plurality of video frames are a plurality of consecutive video frames within preset duration.

In a possible implementation of the first aspect, the method further includes: The electronic device obtains a real-time image of the user by using a camera of the electronic device, displays the real-time image of the user in a first interface, and obtains, from the real-time image, a video frame that has specified duration and that includes both the face and the hand of the user. The user may perform a hand action while watching a face situation of the user. It is more intuitive and convenient to operate.

In a possible implementation of the first aspect, before the obtaining a plurality of video frames including both a face and a hand of a user, the method further includes: The electronic device determines, in response to an input operation performed by the user, to execute a makeup mode or a skin care mode. In other words, the user may first determine whether the user is to perform makeup or skin care. After the electronic device determines a state specified by the user, the electronic device provides a targeted makeup or skin care suggestion based on the gesture of the user.

In a possible implementation of the first aspect, that the electronic device outputs the extended content includes: The electronic device displays a second interface, where the second interface includes the detection target determined based on the target hand action and the extended content corresponding to the shape of the detection target; or the electronic device voice-broadcasts the detection target determined based on the target hand action and the extended content corresponding to the shape of the detection target. This display manner is more intuitive, and it is convenient to provide a makeup or skin care suggestion to the user.

In a possible implementation of the first aspect, the extended content includes: one or more of a problem analysis and a care suggestion of the detection target in a skin care state, or one or more of a makeup state analysis and a makeup suggestion of the detection target in a makeup state.

According to a second aspect, this application further provides a skin detection apparatus. The apparatus includes: an obtaining module, configured to obtain a plurality of video frames including both a face and a hand of a user, for example, a real-time image of the user; and a processing module, configured to: recognize, by using a recognition module, an action of the hand of the user relative to the face in the plurality of video frames, and determine a target hand action. The processing module determines a detection target in at least some regions on the face of the user in the video frame in response to the target hand action. The detection target may include one or more of a pimple, a fine line, a pore, a blackhead, acne, a plaque, redness, a nose, a mouth, an eye, an eyebrow, a facial contour, a skin color, and the like. The processing module determines, from an extended content library based on the detection target and a shape of the detection target (for example, a shape of the eyebrow is a crescent shape or a splayed shape), extended content associated with the detection target and the shape of the detection target, and outputs the extended content. The extended content may include: one or more of a problem analysis and a care suggestion of the detection target in a skin care state, or one or more of a makeup state analysis and a makeup suggestion of the detection target in a makeup state. In this embodiment of this application, a gesture of the user and an intention indicated by the gesture can be accurately recognized based on a real-time image of the user in a skin care or makeup process, and skin state information corresponding to the gesture and a skin care or makeup processing suggestion are provided. In this way, an interaction process between the user and a device is more natural and smoother, and user experience is improved.

In a possible implementation of the second aspect, the determining a target hand action includes: The processing module determines a hand action as the target hand action when determining that a distance between a location at which a fingertip of a finger is located and a location at which the face is located in the video frame is less than a preset distance. The hand action is determined as a target action by determining a distance between the finger and the face, to avoid a case in which some unnecessary gestures are incorrectly recognized and the intention of the user is wrongly determined In a possible implementation of the second aspect, the determining a target hand action includes: The processing module determines a hand action as the target hand action when determining that a distance between a location at which a fingertip of a finger is located and a location at which the face is located in the video frame is less than a preset distance, and determining that duration in which the finger is still relative to the face in the video frame is greater than a preset time period. Accuracy of determining the intention of the user based on the gesture is further improved.

In a possible implementation of the second aspect, the determining a target hand action includes: The processing module determines that a video includes two hands, and determines a hand action as the target hand action when determining that a distance between a location at which fingertips of fingers of the two hands are located and a location at which the face is located in the video frame is less than a preset distance, and determining that duration in which the fingers of the two hands are still relative to the face in the video frame is greater than a preset time period.

In a possible implementation of the second aspect, when an amplitude of a relative motion of the finger relative to the face is less than a preset value, the processing module determines that the fingers of the two hands are still relative to the face in the video frame. Gesture determining accuracy can be improved.

In a possible implementation of the second aspect, that the processing module determines that a distance between a location at which the finger is located and the location at which the face is located in the video frame is less than the preset distance includes: a region of the location at which the finger of the user is located overlaps a region of the location at which the face is located in the video frame: or the finger does not overlap the face in the video frame, but a distance between the fingertip of the finger and an edge point that is of the face and that is closest to the fingertip of the finger is less than the preset distance.

In a possible implementation of the second aspect, that the processing module determines a detection target in at least some regions on the face of the user in the video frame in response to the target hand action includes: determining, from at least one of the plurality of video frames, an intersection region between a region to which the finger points in the target hand action and a region in which the face is located, and determining the detection target in the intersection region. The detection target in the intersection region is determined, so that the user can directly find the detection target based on a direction to which the finger points, to help the user have an intuitive and natural feeling, and improve interaction experience of the user.

In a possible implementation of the second aspect, the region to which the finger points is a geometric shape determined by using the fingertip of the finger as a reference point and by using, as a reference direction, a direction to which the finger points, and the geometric shape has a size and a contour that are preset by the user.

In a possible implementation of the second aspect, when it is determined that the video includes the two hands, the region to which the finger points is a geometric shape determined by using the fingertip of the finger as a reference point and by using, as a reference direction, a direction to which the finger points, and the geometric shape is a geometric shape preset by the user. An intersection set or a union set of regions to which the fingers of the two hands point is used as the region to which the finger points In a possible implementation of the second aspect, the geometric shape includes any one of a trapezoid, a sector, a triangle, a circle, and a square.

In a possible implementation of the second aspect, the face includes at least one preset ROI region; and that the processing module determines a detection target in at least some regions on the face of the user in the video frame in response to the target hand action further includes: determining, from the at least one of the plurality of video frames, an intersection region between the region to which the finger points in the target hand action and the ROI region included on the face, and determining the detection target in the intersection region. The ROI region may include a forehead, a nasal bridge, a philtrum, a chin, cheeks, an under-eye region, a risorius muscle, or the like. The detection target is determined from the intersection region between the direction to which the finger points and the ROI region on the face of the user, so that a specified region of the user is analyzed with reference to the ROI region on the face, to improve accuracy of analyzing the detection target by an electronic device, and improve an interest of interaction.

In a possible implementation of the second aspect, when it is determined that the intersection region covers at least two ROI regions, the detection target is determined from an ROI region with a largest area in the intersection region.

In a possible implementation of the second aspect, when it is determined that the intersection region covers at least two ROI regions, one ROI region is selected based on a preset priority of the ROI region and/or a matching degree between a detection target in the ROI region and a feature standard model corresponding to the detection target, and the detection target is determined from the selected ROI region.

In a possible implementation of the second aspect, when it is determined that the intersection region covers at least two ROI regions, the following is further included: The electronic device determines the detection target based on a first operation performed by the user on a detection target in the ROI region. The user may directly determine the detection target through tapping, or the like based on an observation result of the user, so that the user can select the detection target based on a subjective opinion of the user, to improve interaction experience of the user.

In a possible implementation of the second aspect, the detection target includes one or more skin states of a pimple, a fine line, a pore, a blackhead, acne, a plaque, and redness, or the detection target includes one or more of a nose, a mouth, an eye, an eyebrow, a facial contour, and a skin color.

In a possible implementation of the second aspect, the plurality of video frames are a plurality of consecutive video frames within preset duration.

In a possible implementation of the second aspect, the apparatus further includes, the processing module obtains a real-time image of the user by using the obtaining module, displays the real-time image of the user in a first interface of a display module, and obtains, from the real-time image, a video frame that has specified duration and that includes both the face and the hand of the user. The user may perform a hand action while watching a face situation of the user. It is more intuitive and convenient to operate.

In a possible implementation of the second aspect, before the obtaining a plurality of video frames including both a face and a hand of a user, the following is further included: The processing module determines, in response to an input operation performed by the user, to execute a makeup mode or a skin care mode. In other words, the user may first determine whether the user is to perform makeup or skin care. After the electronic device determines a state specified by the user, the electronic device provides a targeted makeup or skin care suggestion based on the gesture of the user.

In a possible implementation of the second aspect, that the processing module outputs the extended content includes: displaying a second interface by using a display module, where the second interface includes the detection target determined based on the target hand action and the extended content corresponding to the shape of the detection target: or the electronic device voice-broadcasts the detection target determined based on the target hand action and the extended content corresponding to the shape of the detection target. This display manner is more intuitive, and it is convenient to provide a makeup or skin care suggestion to the user.

In a possible implementation of the second aspect, the extended content includes: one or more of a problem analysis and a care suggestion of the detection target in a skin care state, or one or more of a makeup state analysis and a makeup suggestion of the detection target in a makeup state.

According to a third aspect, an embodiment of this application further provides an electronic device, including one or more memories, one or more processors coupled to the memory, and one or more programs. The one or more programs are stored in the memory, and the electronic device is configured to perform the method in the embodiment of the first aspect.

According to a fourth aspect, an embodiment of this application provides a computer-readable storage medium. The computer-readable storage medium stores a computer program. When the computer program is run by a processor, the processor is enabled to perform the method in the embodiment of the first aspect.

According to a fifth aspect, an embodiment of this application provides a computer program product including instructions. When the computer program product runs on an electronic device, a processor is enabled to perform the method in the embodiment of the first aspect.

BRIEF DESCRIPTION OF DRAWINGS

FIG. 10a is a schematic diagram of a pimple grade image and a corresponding description corpus according to an embodiment of this application;

DESCRIPTION OF EMBODIMENTS

The following clearly and completely describes the technical solutions in embodiments of this application with reference to the accompanying drawings in embodiments of this application.

In various embodiment of this application, an electronic device may be a device having an image recognition function, for example, a mobile phone, a notebook computer, a tablet computer, a desktop computer, a laptop computer, an ultra-mobile personal computer (Ultra-mobile Personal Computer, UMPC), a handheld computer, a netbook, a personal digital assistant (Personal Digital Assistant, PDA), a wearable electronic device, or a smart mirror.

Figure 1:
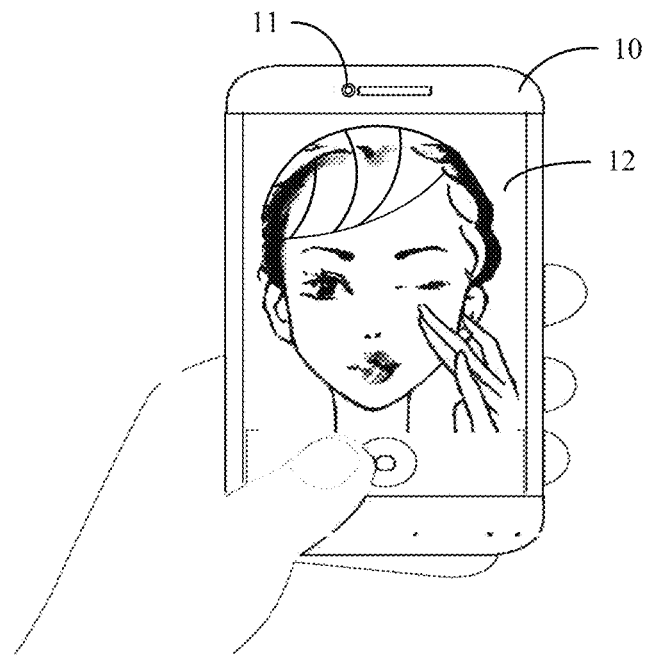
FIG. 1 is a diagram of an interaction scenario in which a user uses a mobile phone according to an embodiment of this application.
Figure 2A:
FIG. 2a is a diagram of an interaction scenario in which a user uses a mobile phone according to an embodiment of this application.

The following describes embodiments of this application with reference to a specific scenario by using interaction between a user and a mobile phone as an example FIG. 1 and FIG. 2a are diagrams of an interaction scenario in which a user uses a mobile phone according to an embodiment of this application. In this scenario, the user wants to implement a skin care effect by interacting with the mobile phone. Referring to FIG. 1, a mobile phone 10 is provided with a front-facing camera 11 on a same side as a screen 12. The camera 11 may be used to capture a video stream or a photo in real time, and the captured video stream is displayed on the screen 12 in real time. The user may observe a hand action and a face image of the user in real time by using the screen 12. Referring to FIG. 2a, the user uses a finger to point to a facial region that is on a face of the user and that includes a detection target (an image feature), for example, to point to a facial region including a pimple. The mobile phone 10 obtains a video frame having preset duration, recognizes a distance between the finger and the face from the video frame and a time period in which the distance is maintained, and further determines whether the user wants to learn of a skin care state based on the hand action. When it is determined that the hand action is a target hand action, in other words, the hand action is determined as a skin care action instruction that is entered by the user, the mobile phone 10 further obtains at least one video frame corresponding to the target hand action, recognizes an image feature from an intersection region between a region to which the finger points and the face in the video frame, and further outputs corresponding extended content based on the image feature.

In an embodiment of this application, the detection target may include one or more of image features such as a skin color, a pimple, a fine line, a pore, a blackhead, acne, a plaque, redness, a nose, an eye, an eyebrow, a mouth, a chin, and a forehead recognized from the video frame of the user. In addition, a shape of the detection target such as one or more of image features such as an eyebrow shape, a nose shape, a mouth shape, a chin shape, a forehead shape, and a facial contour may be determined based on the detection target.

In this embodiment of this application, the region to which the finger points is a geometric shape determined by an electronic device by using a fingertip of the finger as a reference point and by using, as a reference direction, a direction to which the finger points. The geometric shape has a specified size and contour, and the geometric shape may be preset by the user, or may be prestored by the electronic device. The geometric shape may include any geometric shape in a trapezoid, a sector, a triangle, a circle, and a square. In a specific implementation, the user may freely define a size and a contour based on an actual situation.

In this embodiment of this application, the extended content may include one or more of a state analysis and a care suggestion of the detection target in a skin care state, or one or more of a makeup state analysis and a makeup suggestion of the detection target in a makeup state. The extended content may be stored in an extended content library. The extended content library may be stored in a cloud server. The electronic device communicates with the cloud server. When the electronic device needs the extended content, the electronic device may obtain corresponding content from the cloud server. The extended content may be updated periodically on the cloud server end, to provide the user with a cutting-edge makeup and skin care knowledge point. In another embodiment of this application, the extended content may also be directly stored in the electronic device, so that the electronic device can invoke the extended content at any time.

Figure 2B:
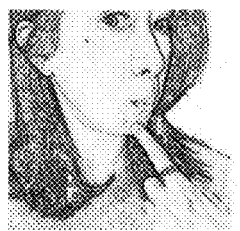
FIG. 2b is a diagram of a plurality of scenarios in which a single hand of a user points to a facial region according to an embodiment of this application.
Figure 2B:
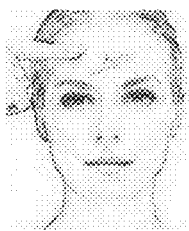
Figure 2B:
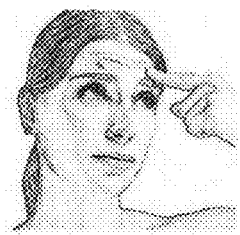
Figure 2B:
Figure 2C:
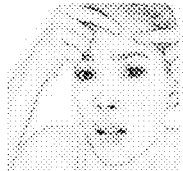
FIG. 2c is a diagram of a plurality of scenarios in which two hands of a user point to a facial region according to an embodiment of this application.
Figure 2C:
Figure 2C:
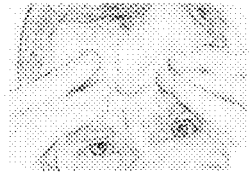
Figure 2C:
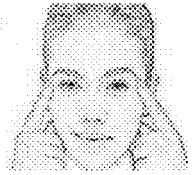

In this embodiment of this application, the hand action of the user may include that a finger of a single hand points to a facial region in which the detection target is located. FIG. 2b is a diagram of a plurality of scenarios in which a single hand of a user points to a facial region. The scenarios include hand actions that the user uses a finger of a single hand to point to a pimple on the face, a stain, a wrinkle, a nose, and the like. The hand action may alternatively include that fingers of two hands point to a facial region in which the detection target is located. FIG. 2c is a diagram of a plurality of scenarios in which fingers of two hands of a user point to a facial region. As shown in FIG. 2c, the scenarios include a hand action that the user uses the fingers of the two hands to point to a pimple on the face, a stain, a wrinkle, an eyebrow, or the like. That the finger points to the facial region in this application is merely an example description. In this application, the finger may alternatively point to another part, for example, a mouth, a chin, a redness zone, or a blackhead. This is not limited herein.

According to this embodiment of this application, the mobile phone may directly learn of an intention of the user based on the hand action of the user, and does not need to detect an entire image of the user, but only detects a region specified by the user. In a state in which the user looks at a mirror, the finger points to a specific region on the face, to obtain a related knowledge point related to an image feature in the region. For example, during skin care, a skin state such as a pimple, a grade, a care suggestion, and the like are obtained. During makeup, a makeup suggestion, or the like may be obtained. In this way an interaction process is simpler, smoother, and more natural.

The following describes an example mobile phone provided in the following embodiments of this application with reference to accompanying drawings.

Figure 3:
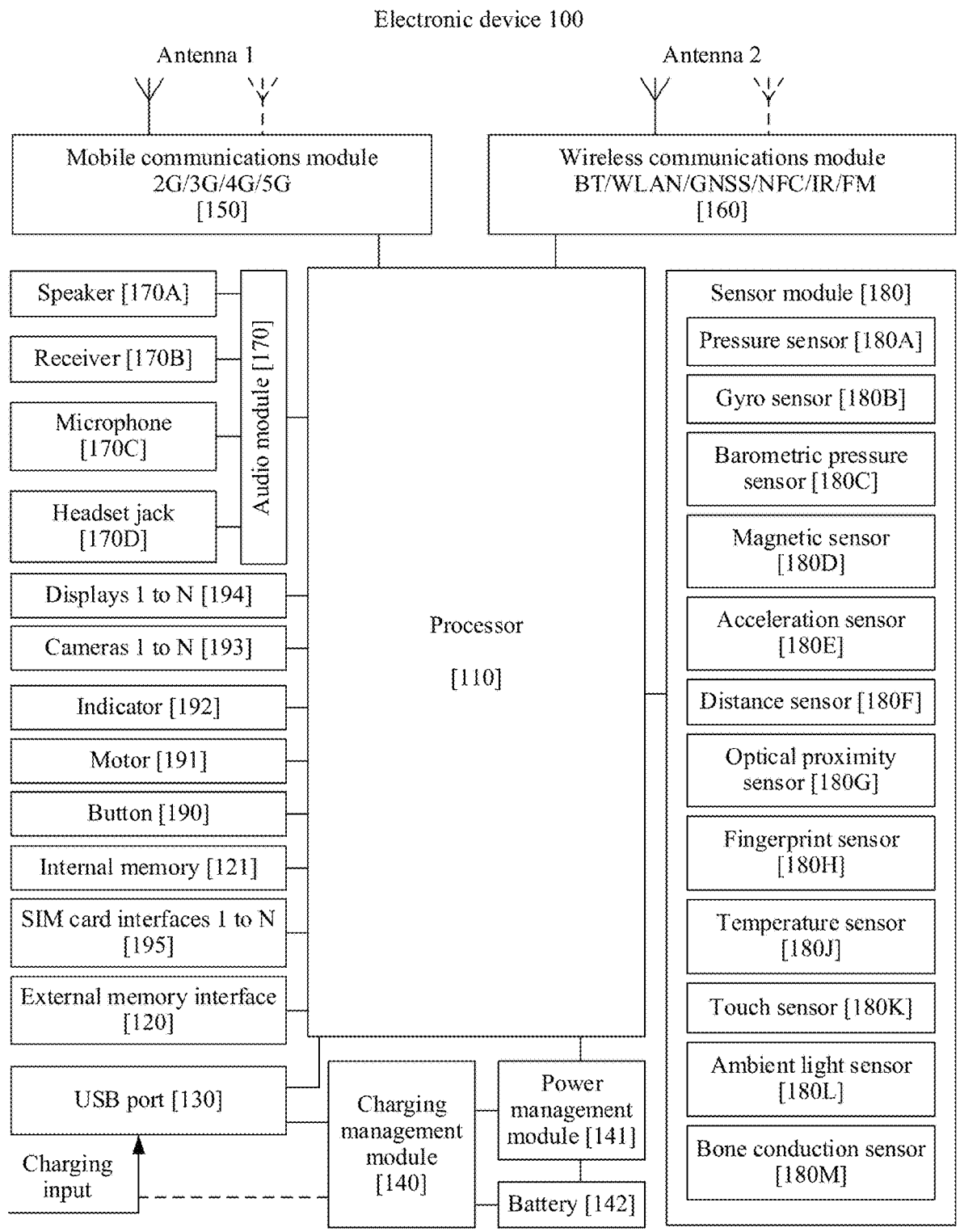
FIG. 3 is a schematic diagram of a structure of a mobile phone according to an embodiment of this application.

FIG. 3 is a schematic diagram of a structure of a mobile phone. The mobile phone 100 may include a processor 110, an external memory interface 120, an internal memory 121, a universal serial bus (universal serial bus. USB) connector 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of this application does not constitute a specific limitation on the mobile phone 100. In some other embodiments of this application, the mobile phone 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural processing unit (neural-processing unit, NPU), and/or the like. Different processing units may be independent devices, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, and/or the like.

It can be understood that an interface between modules shown in this embodiment of this application is merely an example description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

A USB connector 130 is a connector that complies with a USB standard specification, and may be configured to connect the mobile phone 100 and a peripheral device. Specifically, the USB connector 130 may be a standard USB connector (for example, a Type C connector), a Mini USB connector, a Micro USB connector, or the like. The USB connector 130 may be configured to be connected to a charger to charge the mobile phone 100, or may be configured to transmit data between the mobile phone 100 and the peripheral device. The USB connector 130 may be alternatively configured to connect to a headset, to play audio by using the headset. The connector may alternatively be configured to be connected to another mobile phone, for example, an AR device. In some implementation solutions, the processor 110 may support a universal serial bus (Universal Serial Bus), and a standard specification of the universal serial bus may be USB 1.x, USB 2.0, USB 3.x, and USB 4.

The charging management module 140 is configured to receive a charging input from the charger. The charger may be a wireless charger or a wired charger. In some embodiments of wired charging, the charging management module 140 may receive a charging input from a wired charger through the USB connector 130. In some embodiments of wireless charging, the charging management module 140 may receive a wireless charging input through a wireless charging coil of the mobile phone 100. While charging the battery 142, the charging management module 140 may further supply power to the mobile phone by using the power management module 141.

The power management module 141 is configured to be connected to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be alternatively configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may also be disposed in a same component.

A wireless communications function of the mobile phone 100 may be implemented by using the antenna 1, the antenna 2, the mobile communications module 150, the wireless communications module 160, the modem processor, the baseband processor, or the like.

The antenna 1 and the antenna 2 are configured to transmit and receive an electromagnetic wave signal. Each antenna of the mobile phone 100 may be configured to cover a single communication frequency band or a plurality of communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution to wireless communication including 2G/3G/4G/5G applied to the mobile phone 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

In an embodiment, the mobile communications module 150 may be communicatively connected to a cloud server, so that the processor 110 obtains, from the cloud server, extended content corresponding to an image feature, for example, a knowledge point such as one or more of a problem analysis and a care suggestion of a detection target in a skin care state, or one or more of a makeup state analysis and a makeup suggestion of a detection target in a makeup state.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another functional module The wireless communications module 160 may provide a wireless communication solution that is applied to the mobile phone 100, and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna I of the mobile phone 100 is coupled to the mobile communications module 150, and the antenna 2 is coupled to the wireless communications module 160, so that the mobile phone 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access. CDMA), wideband code division multiple access (wideband code division multiple access. WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or satellite based augmentation systems (satellite based augmentation systems. SBAS).

The mobile phone 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode. FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1.

In an embodiment, the display 194 may be configured to: display an image or a video of a user, or display text information to remind the user of an action that needs to be performed currently, so that the user performs, based on indicated text information, a corresponding action when facing the camera. Therefore, the processor 110 determines, based on an image obtained by the camera, that the user is in an awake state, stores pupil information of the user in this state, and uses the pupil information as a pupil model that is of the user and that is used for comparison in a process of unlocking the mobile phone 100. The pupil information may be pupil depth information (for example, 3D image data), and the pupil model may be a pupil depth model (a 3D model of a human face). Alternatively, the processor 110 may display an unlocked interface in response to a received unlocking instruction of the user. The interface may include a human face input box, text information for prompting the user to perform unlocking, or the like. Alternatively, after performing an unlocking operation, the processor 110 may display an interface that can be directly operated by the user, or when performing an unlocking forbidding operation, the processor 110 may display an interface that fails to be unlocked, or the like.

The mobile phone 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the mobile phone 100 may include one or N cameras 193, where N is a positive integer greater than 1.

In an embodiment, the camera 193 captures a video or a static image (video frame) including both a face, a hand action, and the like of the user, so that the mobile phone 100 can determine, from a plurality of video frames in the video, a target hand action of the user and an image feature specified by the target hand action. The processor 110 invokes, based on the image feature, the corresponding one or more of the problem analysis and the care suggestion of the detection target in the skin care state, or the corresponding one or more of the makeup state analysis and the makeup suggestion of the detection target in the makeup state.

The digital signal processor is configured to process a digital signal, and may process another digital signal in addition to the digital image signal. For example, when the mobile phone 100 selects a frequency, the digital signal processor is configured to perform Fourier transform on energy of the frequency.

The video codec is configured to: compress or decompress a digital video. The mobile phone 100 may support one or more video codecs. Therefore, the mobile phone 100 may play or record videos in a plurality of coding formats, for example, moving picture experts group (moving picture experts group. MPEG)-1. MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the mobile phone 100, for example, image recognition, facial recognition, speech recognition, and text understanding, may be implemented through the NPU.

In an embodiment, the NPU may implement recognition performed by the mobile phone 100 on a biometric feature such as pupil information recognition, fingerprint recognition, gait recognition, or voice recognition, so that the mobile phone 100 can unlock or forbid unlocking of the mobile phone 100 by using various biometric feature-based recognition technologies.

The external memory interface 120 may be used to connect to an external storage card, for example, a micro SD card, to extend a storage capability of the mobile phone 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data or a phone book) created in a process of using the mobile phone 100. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the mobile phone 100.

In some embodiments, the processor 110 may invoke instructions in the internal memory 121, so that the mobile phone 100 sequentially performs an interaction method for an electronic device for skin detection according to embodiments of this application. The method includes: The camera 193 is enabled to obtain a plurality of video frames including both a face and a hand of a user. The processor 110 recognizes an action of the hand of the user relative to the face in the plurality of video frames, and determines a target hand action. The processor 110 determines a detection target in at least some regions on the face of the user in the video frame in response to the target hand action. The processor 110 determines, from an extended content library based on the detection target and a shape of the detection target, extended content associated with the detection target and the shape of the detection target, and outputs the extended content. The user may directly obtain, based on a hand action, a knowledge point that the user wants to learn of. An interaction process is simple and smoother.

The internal memory 121 and/or an external storage area may store the extended content of the user. After determining the detection target, the processor 110 may directly invoke the extended content corresponding to the detection target, for example, one or more of a problem analysis and a care suggestion of the detection target in a skin care state, or one or more of a makeup state analysis and a makeup suggestion of the detection target in a makeup state.

The mobile phone 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile phone 100 may listen to music or listen to a hands-free call through the speaker 170A.

In an embodiment, the speaker 170A may play voice information to notify the user of a detection target corresponding to a current hand action of the user and extended content corresponding to a shape of the detection target, so that the user learns of a skin care or makeup knowledge point based on a voice.

The optical proximity sensor 180G may include a light-emitting diode (LED) and an optical detector, for example, a photodiode. The light-emitting diode may be an infrared light-emitting diode. The mobile phone 100 emits infrared light by using the light-emitting diode. The mobile phone 100 detects infrared reflected light from a nearby object by using the photodiode. When a plenty of reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear for a call, to automatically turn off the screen to save power. The optical proximity sensor 180G may also be used in a leather case mode or a pocket mode to automatically unlock or lock the screen.

In some embodiments, when an object (a human face or a finger) approaches the mobile phone 100, the optical proximity sensor 180G senses that an object approaches the mobile phone 30, and sends, to the processor 110 of the mobile phone 30, a signal indicating that an object approaches. The processor 110 receives the signal indicating that an object approaches, and controls the display 194 to be lit, or directly collects a video of the object by using the camera 193. so that the processor 110 determines a target hand action based on the video, and determines a detection target based on the target hand action.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G, to detect whether the mobile phone 100 is in a pocket, to avoid an accidental touch.

The fingerprint sensor 180H is configured to collect a fingerprint. The mobile phone 100 may implement fingerprint unlocking by using a collected fingerprint feature, to recognize a user identity and obtain corresponding permission, for example, access an application lock, implement fingerprint photographing, or implement fingerprint answering.

A hierarchical architecture, an event-driven architecture, a micro-core architecture, a microservice architecture, or a cloud architecture may be used for a software system of the mobile phone 100. In an embodiment of this application, an Android system of the hierarchical architecture is used as an example to describe a software structure of the mobile phone 100.

Figure 4:
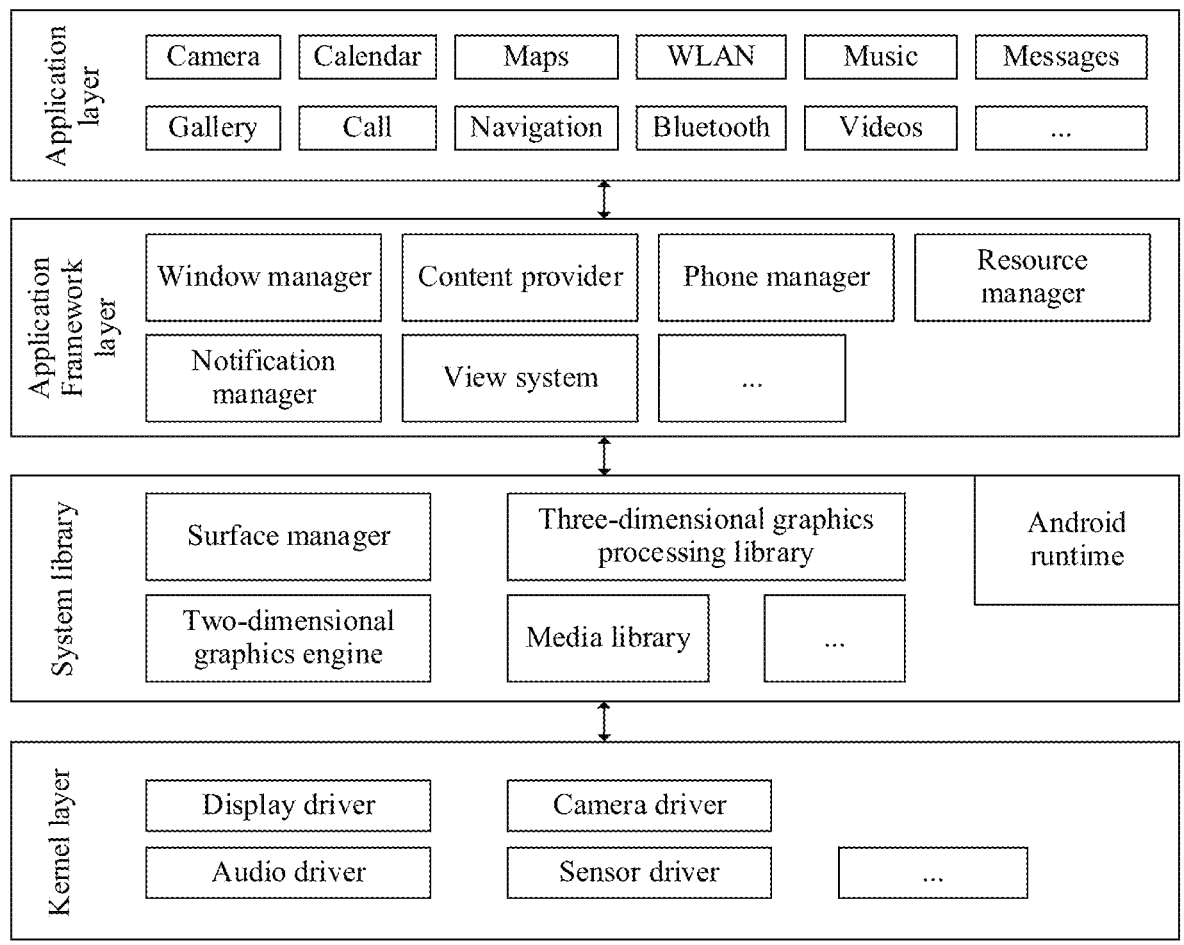
FIG. 4 is a block diagram of a software structure of a mobile phone according to an embodiment of this application.

FIG. 4 is a block diagram of a software structure of a mobile phone 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 4, the application packages may include applications such as Camera. Gallery, Calendar, Call, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the mobile phone 100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is prompted in the status bar, an alert sound is made, the mobile phone vibrates, or an indicator blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules such as a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library supports a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

With reference to a scenario in which makeup or skin care is performed in the mobile phone 100 and diagrams in FIG. 3 and FIG. 4, the following describes an example operating process of software and hardware of the mobile phone 100.

The mobile phone 100 includes the camera 193. When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains an original input event from the kernel layer, and recognizes a control corresponding to the original input event. For example, the touch operation is a touch and tap operation, and a control corresponding to the tap operation is a control of a makeup and skin care application icon. A skin care/makeup application invokes an interface of the application framework layer to start the skin care/makeup application, and further starts a camera driver by invoking the kernel layer, to capture an image or a video of a face and a hand action of a static user by using the camera 193. Image recognition is performed at the application framework layer, and a detection target is determined. After the detection target is determined, a system library invokes the content provider of the application framework layer to obtain extended content corresponding to the detection target, and invokes the display driver of the kernel layer, so that the display 194 displays an interface related to the extended content.

Figure 5:
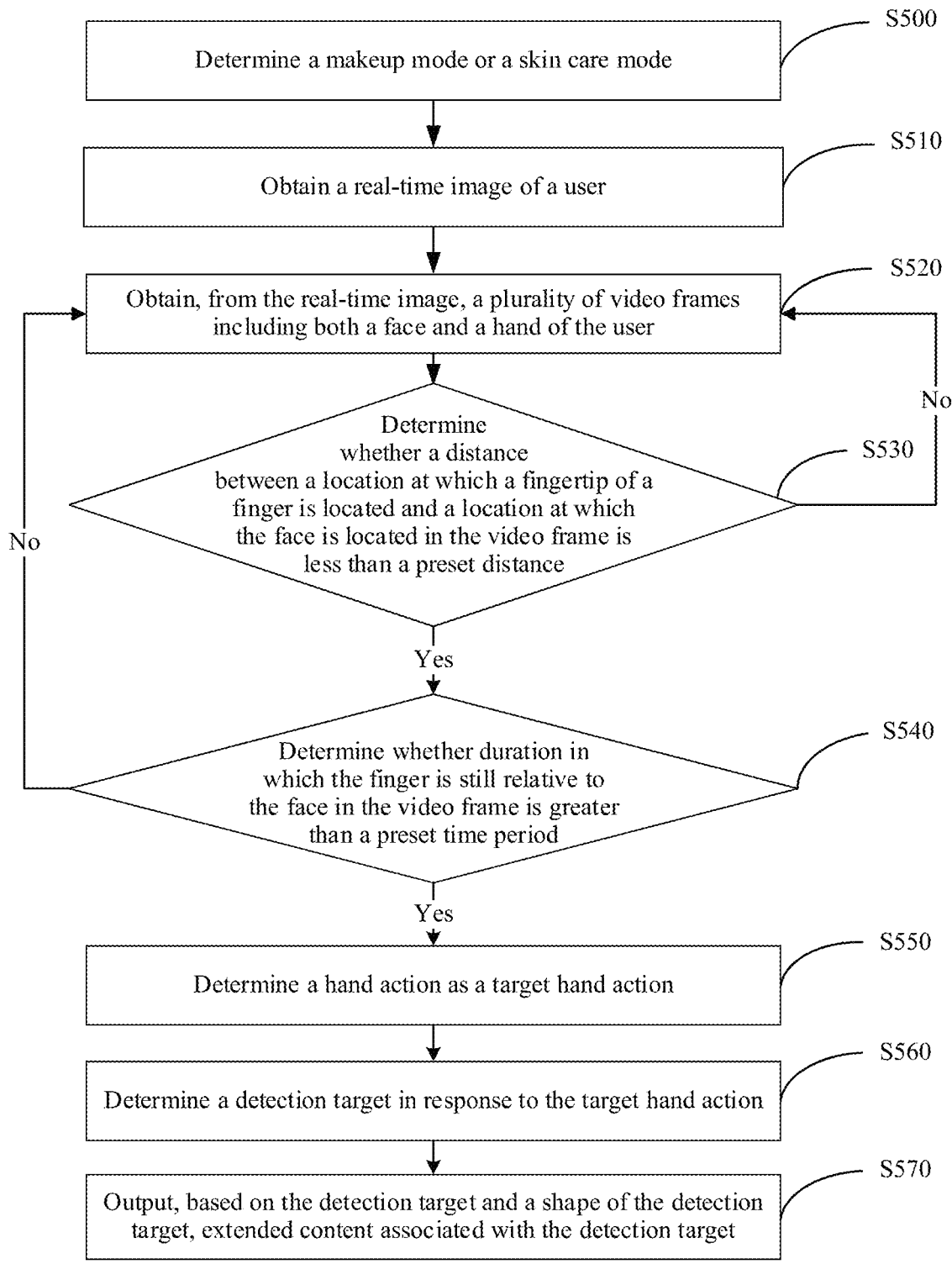
FIG. 5 is a flowchart of an interaction method for an electronic device for skin detection according to an embodiment of this application.

The following describes an interaction method for an electronic device for skin detection in this application by using a specific embodiment. The method is applied to an electronic device. The following describes in detail an interaction process of the electronic device for skin detection in this application by using a mobile phone as an electronic device. FIG. 5 is a flowchart of an interaction method for an electronic device for skin detection according to this application. As shown in FIG. 5, the interaction method may include the following steps.

Step S500: A processor of the mobile phone determines a makeup mode or a skin care mode. A user may manually select the makeup mode or the skin care mode based on a requirement of the user, and step 510 is to be performed after the processor receives the mode selected by the user. In this embodiment of this application, when the processor determines the makeup mode or the skin care mode as described above, and performs various processing shown in FIG. 5, it is essentially intended to indicate that the processor performs various processing by executing an application stored in a storage area of the mobile phone.

Step S510: A camera obtains a real-time image of the user.

The real-time image may be obtained by using a front-facing camera, or may be obtained by using a rear-facing camera. When the user wants to view a face of the user by using a display, the front-facing camera may be used, so that the user can view the real-time image of the user.

Step S520: The processor obtains, from the real-time image, a plurality of video frames including both a face and a hand of the user.

The plurality of video frames may be a plurality of consecutive video frames within 5 seconds. The processor obtains the plurality of consecutive video frames within 5 seconds, to recognize a hand action of the user. The face and the hand may be recognized by using an existing recognition technology. Details are not described in this application.

Step S530: The processor determines whether a distance between a location at which a fingertip of a finger is located and a location at which the face is located in the video frame is less than a preset distance, for example, whether the distance between the location at which the fingertip of the finger is located and the location at which the face is located is less than 2 cm. The finger may be a finger of a single hand, or may be fingers of two hands. When the distance between the location at which the fingertip of the finger is located and the location at which the face is located is less than 2 cm, the mobile phone performs step 540; and when the distance is greater than or equal to the preset distance, the mobile phone performs step 520.

Step S540: The processor determines whether duration in which the finger is still relative to the face in the video frame is greater than a preset time period. For example, the processor determines whether the duration in which the finger is still relative to the face in the video frame is greater than 3 seconds. If the time period is greater than 3 seconds, the mobile phone performs step S550; and if the time period is less than or equal to 3 seconds, step S520 is performed.

Step S550: The processor determines the hand action as a target hand action. After determining the target hand action, the processor uses the target hand action as an instruction entered by the user, to perform step S560.

Step S560: The processor determines a detection target in response to the target hand action. A specific process of determining the detection target may be described in detail in the following embodiment. For details, refer to detailed descriptions of step S560 in the following embodiment. Step S570: The processor outputs, based on the detection target and a shape of the detection target, extended content associated with the detection target and the shape of the detection target. The extended content may include: one or more of a problem analysis and a care suggestion of the detection target in a skin care state, or one or more of a makeup state analysis and a makeup suggestion of the detection target in a makeup state.

In a specific implementation of this application, during creation of the application in the mobile phone, the following parameters are preset: a parameter that a length of the consecutive video frames is 5 seconds, a parameter of whether the distance between the location at which the fingertip of the finger is located and the location at which the face is located is less than 2 cm, and a parameter of whether the duration in which the finger is still relative to the face is greater than 3 seconds. A time length and a value of the distance herein are not limited thereto, or may be another value. For example, the parameters may be a parameter that the length of the consecutive video frames may be 10 seconds. 20 seconds, or the like, a parameter of whether the duration in which the finger is still relative to the face is greater than 2 seconds, 4 seconds, or the like, and a parameter of whether the distance between the location at which the fingertip of the finger is located and the location at which the face is located is less than 1 cm. 3 cm, or the like. The application may also allow the user to change a length of the preset time period or a value of the preset distance.

In another embodiment of this application, the processor may not perform step S540 in the steps of the method. In other words, after determining that the distance between the location at which the fingertip of the finger is located and the location at which the face is located is less than a preset distance of 2 cm in step S530, the processor directly performs step 550.

According to the interaction method for an electronic device for skin detection in this embodiment of this application, a gesture of the user and an intention indicated by the gesture can be accurately recognized based on a real-time image of the user in a skin care or makeup process, and skin state information corresponding to the gesture and a skin care or makeup processing suggestion are provided. In this way, an interaction process between the user and the device is more natural and smoother, and user experience is improved.

The following describes in detail steps S500 to S570 with reference to accompanying drawings and specific embodiments of a user interface of a mobile phone.

Steps shown in FIG. 5 may be implemented in the mobile phone. The steps such as determining a mode and performing determining are executed by a processor of the mobile phone by running an application, and a step such as obtaining a user image may be performed by a camera of the mobile phone under an indication of the processor.

Refer to FIG. 5. In step S500, a makeup mode or a skin care mode is determined.

Figure 6A:
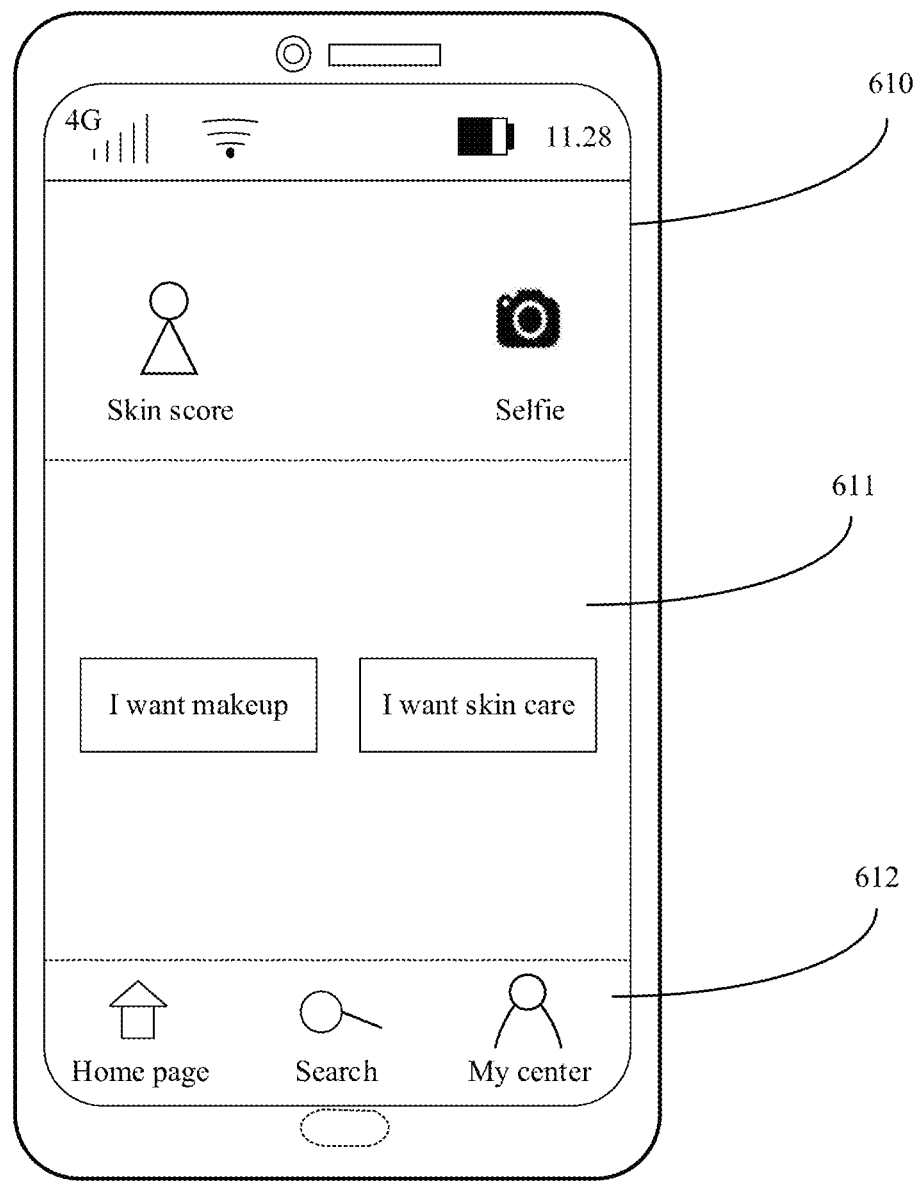
FIG. 6a is a schematic diagram of a user interface in which a user selects a mode according to an embodiment of this application.

FIG. 6a is a schematic diagram of a user interface in which a user selects a mode. As shown in 6a, a user interface 610 includes an option region 611 of skin care or makeup of the user and a navigation bar 612. In the option region 611, a makeup option box and a skin care option box are provided. The user may tap and select "I want makeup", so that the mobile phone enters the makeup mode, or tap and select "I want skin care", to enter the skin care mode. The navigation bar 612 may be provided with icons such as My center, Return to home page, and Search. The user taps and selects these icons to enter a corresponding page. For example, the user taps "My center" to enter a personal home page, to observe personal information, historically stored photos obtained before and after makeup, a fan situation, or the like of the user.

In step S510, a real-time image of the user is obtained. After the mobile phone confirms the mode entered in step S500, the camera is enabled to obtain the real-time image of the user. In addition, to facilitate better interaction between the user and the mobile phone, a front-facing camera may be enabled to collect the real-time image of the user, and the collected real-time image is displayed in an interface. In this embodiment of this application, a rear-facing camera may also be used to help another user or the user collect the real-time image. The front-facing camera is used as an example for description in this application.

Figure 6B:
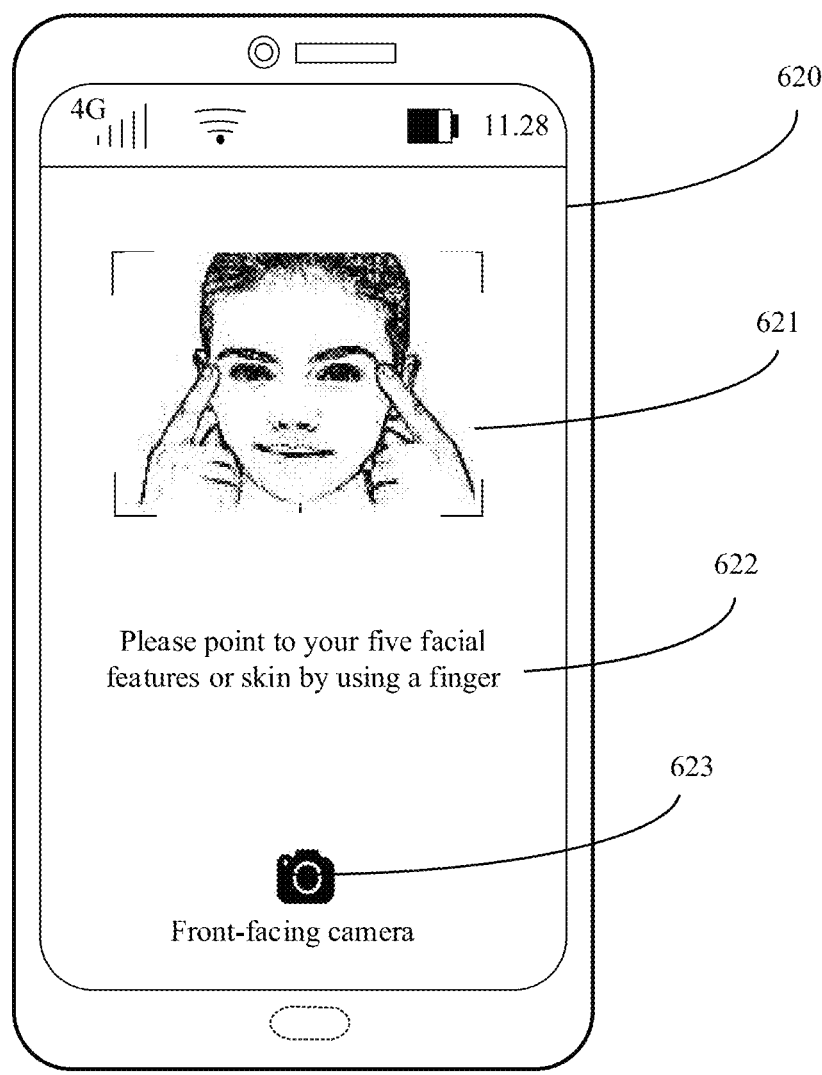
FIG. 6b is a schematic diagram of a user interface of a real-time image of a user in a makeup mode according to an embodiment of this application.

Refer to FIG. 6b. That the user selects the makeup mode is used as an example. FIG. 6 is a schematic diagram of a user interface of a real-time image of a user in a makeup mode. As shown in FIG. 6b, a user interface 620 includes a user image display region 621, a user action prompt region 622, and a front-facing camera or rear-facing camera option icon 623. The image display region 621 may display the real-time image of the user, so that the user can view the real-time image of the user in a timely manner. The prompt region 622 may prompt the user to perform a corresponding action, for example, during makeup, prompt "Please point to your five facial features or a skin by using a finger". The user completes determining of a target action based on a prompt. The front-facing camera or rear-facing camera option icon 623 may implement a case in which the user obtains the real-time image by using the front-facing camera or obtains a real-time image of the user or a friend by using the rear-facing camera, or the like.

In step S520, a plurality of video frames including both a face and a hand of the user are obtained from the real-time image. In other words, the mobile phone obtains the plurality of video frames including the face and the hand of the user, and recognizes, from the plurality of videos, an action of the hand of the user relative to the face, to further determine a target hand action. A hand action includes an action of a finger of a single hand, or may be an action of fingers of two hands.

The following describes a process of determining the target hand action by using a finger of the single hand as an example with reference to accompanying drawings. The target hand action may be directly determined by using only step S530, or may be determined by combining step S530 and step S540. The following describes in detail the process of determining the target hand action by combining step S530 and step 540.

In step S530, whether a distance between a location at which a fingertip of the finger is located and a location at which the face is located in the video frame is less than a preset distance is determined. In other words, the distance between the location at which the fingertip is located and a contact point at the location at which a facial region is located is set to 0. Therefore, when the distance is greater than 0, it indicates that there is a distance between the fingertip and a fingertip on the face, and when the distance is less than 0, the fingertip overlaps the face.

Figure 6C:
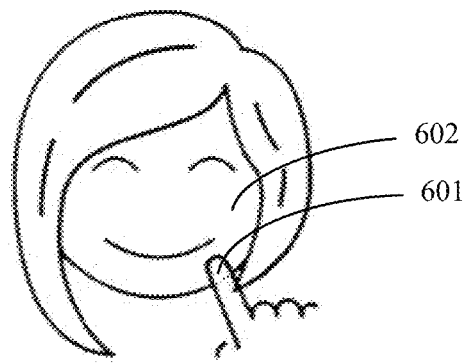
FIG. 6c is a schematic diagram of a location relationship between a fingertip of a finger of a single hand and a facial region according to an embodiment of this application.
Figure 6D:
FIG. 6d is a schematic diagram of a location relationship between a fingertip of a finger of a single hand and a facial region according to an embodiment of this application.

FIG. 6c is a schematic diagram of a location relationship between a fingertip of a finger of a single hand and a facial region. As shown in FIG. 6c, a fingertip 601 of the finger of the single hand of the user overlaps a facial region 602. Therefore, the processor of the mobile phone may determine that a distance between a location at which the fingertip 601 is located and the location at which the facial region is located is less than the preset distance. Alternatively, as shown in FIG. 6d, a distance between a fingertip 603 of the finger of the single hand of the user and a facial region 602 is d. When the distance d is less than the preset distance, the processor of the mobile phone may determine that the distance between the location at which the fingertip 601 is located and the location at which the facial region is located is less than the preset distance. The preset distance d is a shortest distance that is between the fingertip of the finger and the facial region and that is obtained through geometric measurement. In an actual application, the preset distance d may be dynamically adjusted based on a personal situation of the user such as a height, a face size, or a finger length, and may be flexibly set. For example, when a target image that is of the user and that is obtained by an electronic device shows that a face shape of the user is small, in an actual application, the preset distance d may be set to a preset distance that complies with a small face shape, for example, 2 cm, slightly less than 3 cm that is set by default. When the finger of the user points to the facial region, and the distance d between the fingertip of the finger and the facial region is less than or equal to 2 cm, it is determined that a distance between the location at which the fingertip is located and the location at which the facial region is located is less than the preset distance.

In another embodiment of this application, when the finger is fingers of two hands of the user, a finger of each hand satisfies a location relationship between the finger of the single hand and the face. A determining method for the finger of each of the two hands is the same as a determining method for the finger of the single hand. For details, refer to determining of the location relationship between the finger of the single hand and the face in FIG. 6c and FIG. 6d. Details are not described herein again.

In addition, in another embodiment of this application, when the processor recognizes that the finger is fingers of two hands of the user, and a finger of only one hand satisfies a condition that the distance between the location at which the fingertip is located and the location at which the facial region is located is less than the preset distance, the determining method for a single finger may be performed.

Based on the foregoing descriptions, when the processor of the mobile phone determines that the distance between the location at which the fingertip of the finger is located and the location at which the face is located in the video frame is less than the preset distance, step S540 is further performed.

In step S540, whether duration in which the finger is still relative to the face in the video frame is greater than a preset time period is determined.

Specifically, any one of the following determining conditions may be included:

Condition a1: When the finger is still relative to a screen of the mobile phone, the processor determines that the facial region of the user remains still relative to the screen of the mobile phone. In other words, within the preset time period, a movement amplitude of the face relative to the screen of the mobile phone is less than a preset value. For example, within 3 s, a movement amplitude of the facial region relative to the screen of the mobile phone is less than 1 cm. The preset time period and the preset value may be flexibly set based on a scenario in an actual application, to achieve an optimal determining result.

Condition a2: When the face is still relative to the screen of the mobile phone, the processor determines that the finger of the user remains still relative to the screen of the mobile phone. In other words, within the preset time period, a movement amplitude of the hand action relative to the screen of the mobile phone is less than a preset value. For example, within 3 s, the movement amplitude of the hand action is less than 1 cm. The preset time period and the preset distance may be flexibly set based on a scenario in an actual application, to achieve an optimal determining result.

Condition a3: The processor determines that both the finger and the face remain still relative to the screen of the mobile phone. In other words, within the preset time period, movement amplitudes of the face and the hand relative to the screen of the mobile phone are less than a preset value. For example, within 3 s, the movement amplitudes of the face and the hand relative to the screen of the mobile phone are less than 1 cm. The preset time period and the preset value may be flexibly set based on a scenario in an actual application, to achieve an optimal determining result.

When determining that the finger and the face meet any one of the conditions a1, a2, and a3, the processor may determine that duration in which the finger and the face of the user are still meets the preset time period of 3 seconds. Therefore, the processor determines an action of the finger as the target hand action.

In an embodiment of this application, determining the target hand action may further include: After the hand and the face meet any one of the conditions a1, a2, and a3, the following condition is further included:

Condition a4: Determine whether extended content is associated in an intersection region between a region to which the finger of the user points and the facial region, in other words, whether a skin care or makeup knowledge point exists. When the processor of the mobile phone determines that the extended content exists in the intersection region, the processor determines the action of the finger as the target hand action. The region to which the finger points may be a geometric shape determined by using the fingertip of the finger as a reference point and by using, as a reference direction, a direction to which the finger points. The geometric shape is a geometric shape preset by the user. The geometric shape may include any geometric shape in a trapezoid, a sector, a triangle, a circle, and a square. In a specific implementation, the user may freely define a size and a contour based on an actual situation.

Figure 7A:
FIG. 7a is a schematic diagram of an intersection region between a region to which a finger of a single hand points and a face according to an embodiment of this application.

When the finger is the finger of the single hand, reference is made to FIG. 7a. FIG. 7a is a schematic diagram of an intersection region between a region to which a finger of a single hand points and a face. As shown in FIG. 7a, a region 701 to which the finger of the single hand of the user points is a trapezoid. In other words, the intersection region between the region to which the finger points and the face is a region covered by the trapezoid. If the extended content is associated in the intersection region, the processor determines the action of the hand as the target hand action.

Figure 7B:
FIG. 7b is a schematic diagram of an intersection region between a region to which fingers of two hands point and a face according to an embodiment of this application.

When the finger is fingers of two hands, reference is made to FIG. 7b. FIG. 7b is a schematic diagram of an intersection region between a region to which fingers of two hands point and a face. As shown in FIG. 7b, a region 702 to which a finger of each of the two hands points is a trapezoid, and regions to which two fingers point intersect. In this case, an intersection set or a union set of regions 702 to which fingers of the two hands point is used as the region to which the finger points. If extended content is associated in the intersection set or a region of the union set, the processor determines the hand action as the target hand action.

It should be noted that, in this embodiment described in this application, when the determining step in the condition a4 is not performed, it may be considered by default that extended content is associated in a region in which the entire face is located. For determining of the intersection region between the region to which the finger points and the facial region, refer to descriptions corresponding to FIG. 7a and FIG. 7b.

Based on the descriptions, the processor of the mobile phone may determine the target hand action, and perform step S560.

In step S560, the detection target is determined in response to the target hand action. A shape of the detection target may be further determined based on the detection target. The detection target is a detection target in at least some regions on the face of the user in the video frame, and may be specifically determined by using any one or a combination of several methods of the following several methods.

First determining method:

From at least one of the plurality of video frames, an intersection region between a region to which the finger points in the target hand action and the region in which the face is located is determined, and the detection target in the intersection region is determined. For the intersection region between the region to which the finger of the single hand points and the location at which the face is located, refer to FIG. 7a. For an intersection region between the regions to which the fingers of the two hands point and the region in which the face is located, refer to FIG. 7b, and the intersection set or the union set of the regions to which the fingers of the two hands point is used as the region to which the finger points. The detection target may be recognized and determined by using an existing human face recognition technology. Details are not described herein again.

Figure 8A:
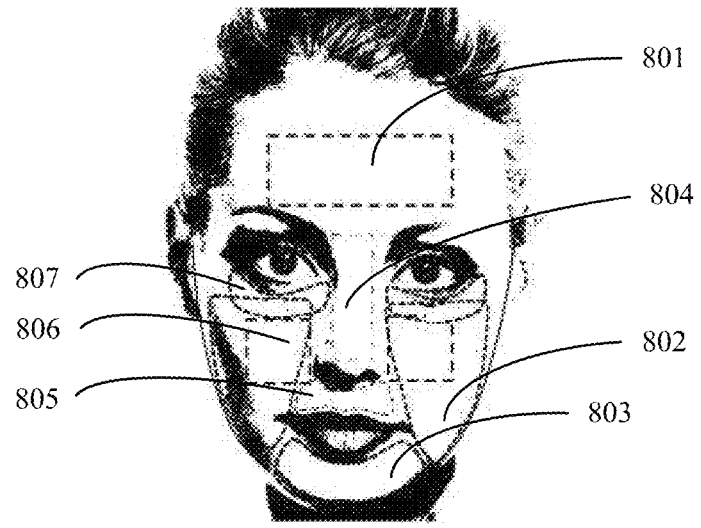
FIG. 8a is a schematic diagram of division into ROI regions of a human face according to an embodiment of this application.

Second determining method:

First, the facial region is divided into ROI regions. FIG. 8a is a schematic diagram of division into ROI regions of a human face. As shown in FIG. 8a, the ROI regions of the human face include a forehead 801, a cheek 802, a chin 803, a nasal bridge 804, a philtrum 805, a risorius muscle 806, an under-eye bag 807, and the like. Some ROI regions may have an overlapping part. For example, a region of the risorius muscle 806 overlaps a region of the cheek 802. In an extended content library, each ROI region on the human face is associated with extended content, and the extended content may merge knowledge points of the ROI regions. For example, in the makeup mode, the region to which the finger of the user points is at a location of the under-eye bag, and a region of the location includes not only a wrinkle but also an under-eye dark circle related to the under-eye bag. Therefore, the ROI regions are combined, so that the extended content is richer, an analysis is more accurate, and an interest of the user is improved.

Then, an intersection region between the region to which the finger of the user points and an ROI region is determined. The detection target is determined from the intersection region.

In an embodiment of this application, in the second method, when the intersection region covers at least two ROI regions, the detection target is determined from an ROI region with a largest coverage area in the intersection region. The coverage area may be an absolute area of a coverage area of the intersection region and the ROI region on the human face. In other words, the coverage area is a real area of a plane geometric shape. For example, the real area is 35 square centimeters. Alternatively, the coverage area may be a relative area of a coverage area of the intersection region and the ROI region on the human face and a human face size. For example, the coverage area is 35 square centimeters, the human face size is 350 square centimeters, and the relative area is a ratio of the coverage area to the human face size, namely, 0.1.

Figure 8B:
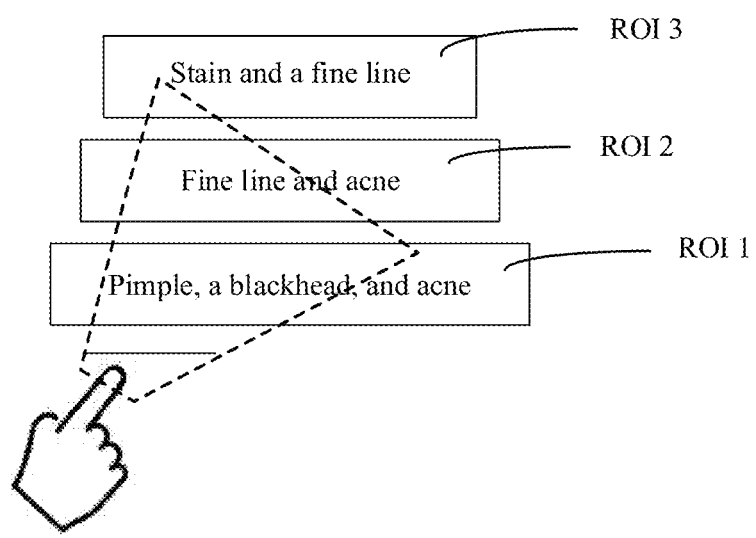
FIG. 8b is a schematic diagram in which an intersection region covers a plurality of ROI regions according to an embodiment of this application.

FIG. 8b is a schematic diagram in which an intersection region covers a plurality of ROI regions. As shown in FIG. 8b, a region 808 to which the finger points covers an ROI region 1, an ROI region 2, and an ROI region 3. In the intersection region, an area of the ROI region 1 is greater than an area of the ROI region 2, and the area of the ROI region 2 is greater than an area of the ROI region 3. Therefore, the detection target may be determined from the ROI region 1 with the largest area.

Third determining method:

A priority is preset for the ROI region, and a detection target is determined from an ROI region with a highest priority in the intersection region. For example, the under-eye bag, the cheek, the nasal bridge, and the like are sequentially arranged in descending order of priorities When the region to which the finger points covers the under-eye bag, the cheek, and the nasal bridge, a detection target is determined from an ROI region in which the under-eye bag is located. Fourth determining method:

A weight value is set for the ROI region in the intersection region. For example, a weight may be set for parameters such as an area of the ROI region in the intersection region and a quantity of times that the ROI region is detected, image features in all ROI regions in the intersection region are detected, and an image feature with a highest score is found from the image features, and is used as the detection target.

The following describes calculation of a score of the image feature by using a weight of the area of the ROI region in the intersection region as an example.

A formula for calculating the score of the image feature is as follows: Score of an image feature=Matching degree of an image feature and a feature standard model corresponding to the image feature*Weight of an area of an ROI region in an intersection region. The image feature may be determined based on a knowledge point in the extended content. Because the determined image feature differs from the feature standard model, an image feature closest to the feature standard model can be found by calculating the matching degree between the image feature and the feature standard model. In addition, an image feature with a higher comprehensive score may be found by multiplying the matching degree and the weight of the ROI region in the intersection region. For example, an image feature found based on the knowledge point in the extended content is a pimple, and a similarity degree between the pimple and a pimple standard model is 99%. In other words, a matching degree is 0.99. If an area weight of an ROI region in which the pimple is located is 0.7, a score of the pimple=0.7*0.99=0.693. A score of another image feature is calculated based on this, and an image feature with a highest score is selected as a detection target.

Figure 8C:
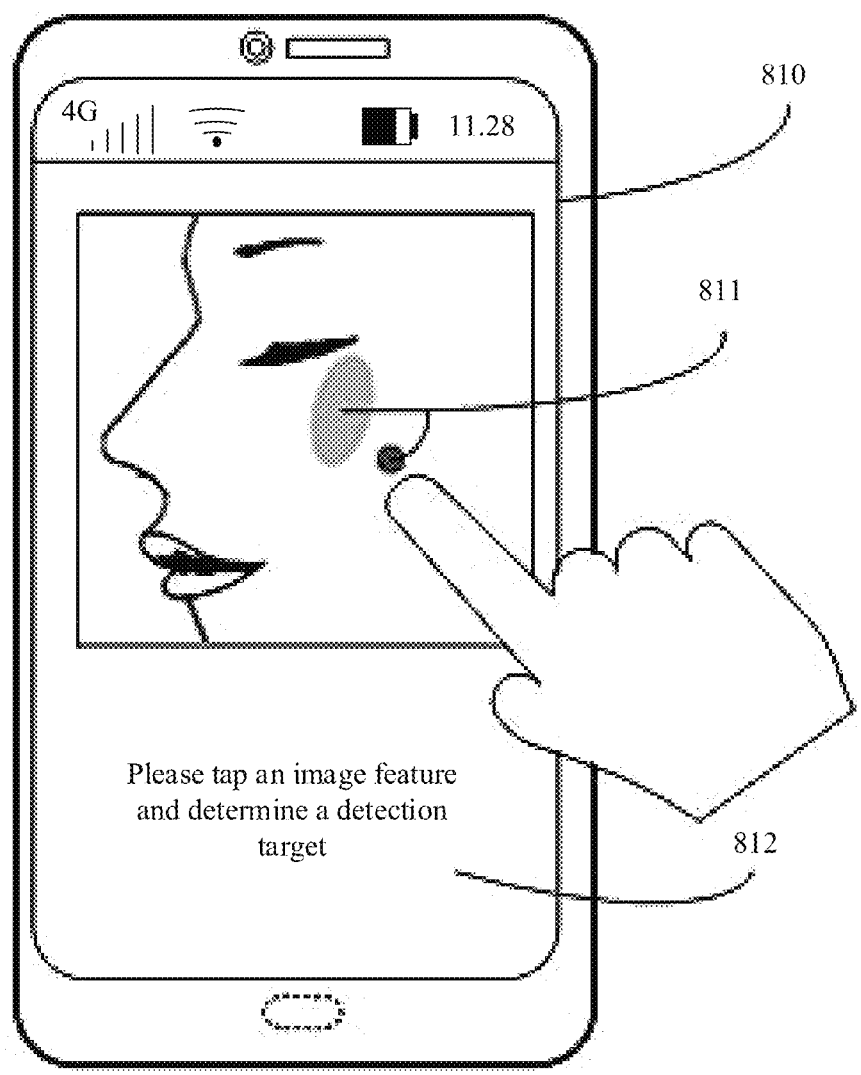
FIG. 8c is a schematic diagram of a user interface of a mobile phone according to an embodiment of this application.

In the first, second, and third determining methods in this application, when the processor determines that there are a plurality of image features in the intersection region, all image features may also be used as detection targets, or the user may perform further select at least one image feature as a detection target in a tap and selection manner, or the like. FIG. 8c is a schematic diagram of a user interface of a mobile phone. A user interface 810 displays a plurality of image features 811 and a user prompt region 812. The image feature 811 may intuitively display an image feature in an intersection region. The user may directly tap the image feature and determine the image feature as a detection target. The user prompt region 812 is configured to display text information used to remind the user to select an image feature, for example, a text used to prompt the user with "Please tap an image feature and determine a detection target".

After the processor determines the detection target in step S560, step S570 is to be performed.

In step S570, extended content associated with a detection target and a shape of the detection target is output based on the detection target and the shape of the detection target. An output manner may be an interface display, voice-broadcasting, a combination of an interface and voice-broadcasting, or the like, so that the user can learn of, by using the user interface and/or through voice-broadcasting, the extended content corresponding to the detection target.

Figure 9A:
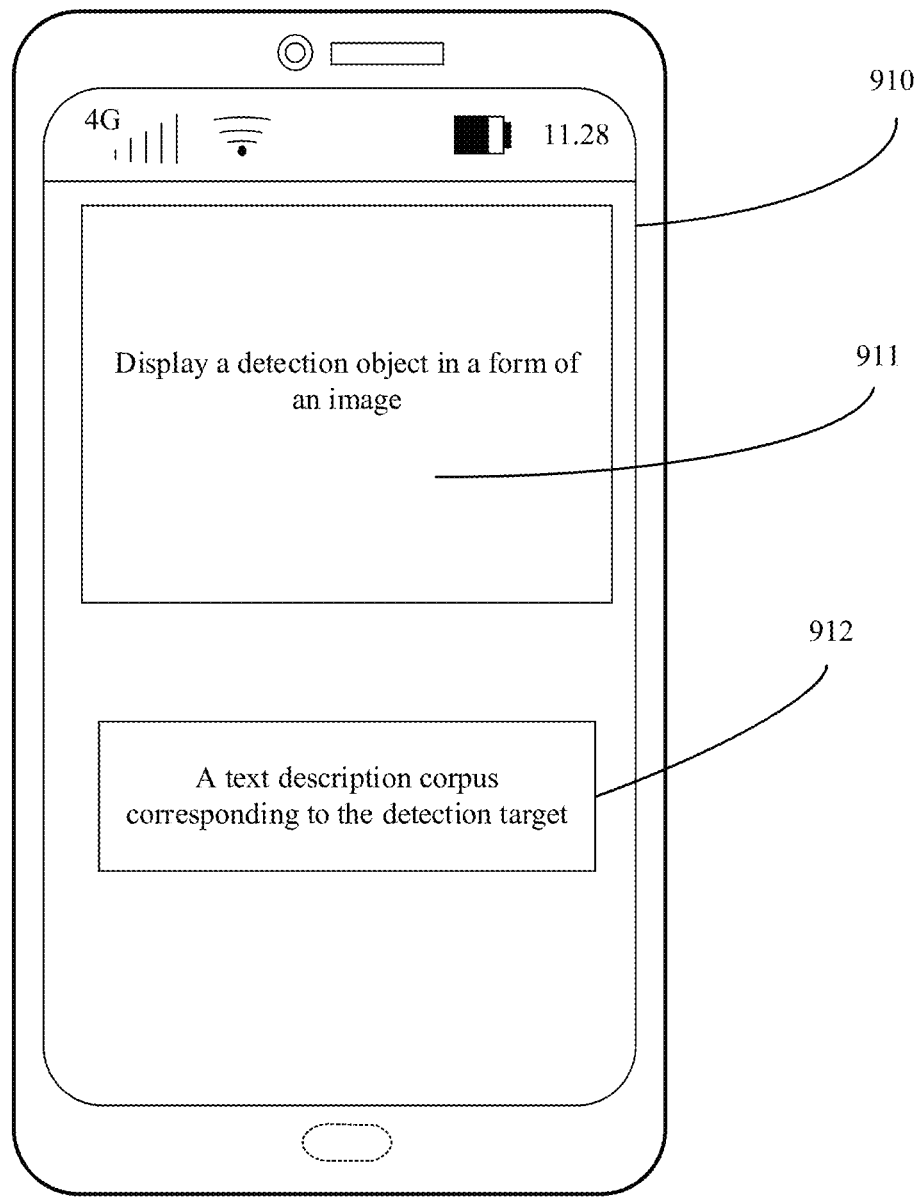
FIG. 9a is a schematic diagram of a user interface of a mobile phone according to an embodiment of this application.

Refer to FIG. 9a. An output in an interface of the mobile phone is used as an example. FIG. 9a is a schematic diagram of a user interface of a mobile phone. As shown in FIG. 9a, a user interface 910 includes an image display region 911 and a knowledge point display region 912. The image display region 911 is configured to display a detection target. The knowledge point display region 912 is configured to display a description corpus (a text description) corresponding to the detection target. The description corpus may select an anthropomorphic description statement to express a knowledge point such as skin care or makeup, and store the knowledge point in an internal memory, an external memory, or a cloud of the mobile phone in various file formats such as a word format and an xml format. The description corpus may describe a state of the detection target, for example, a severity level, a professional classification, a shape, a size, or a color, and a suggestion on how to take care or make up, so that the user more easily learns of the detection target and learns of how to take care or make up.

Figure 9B:
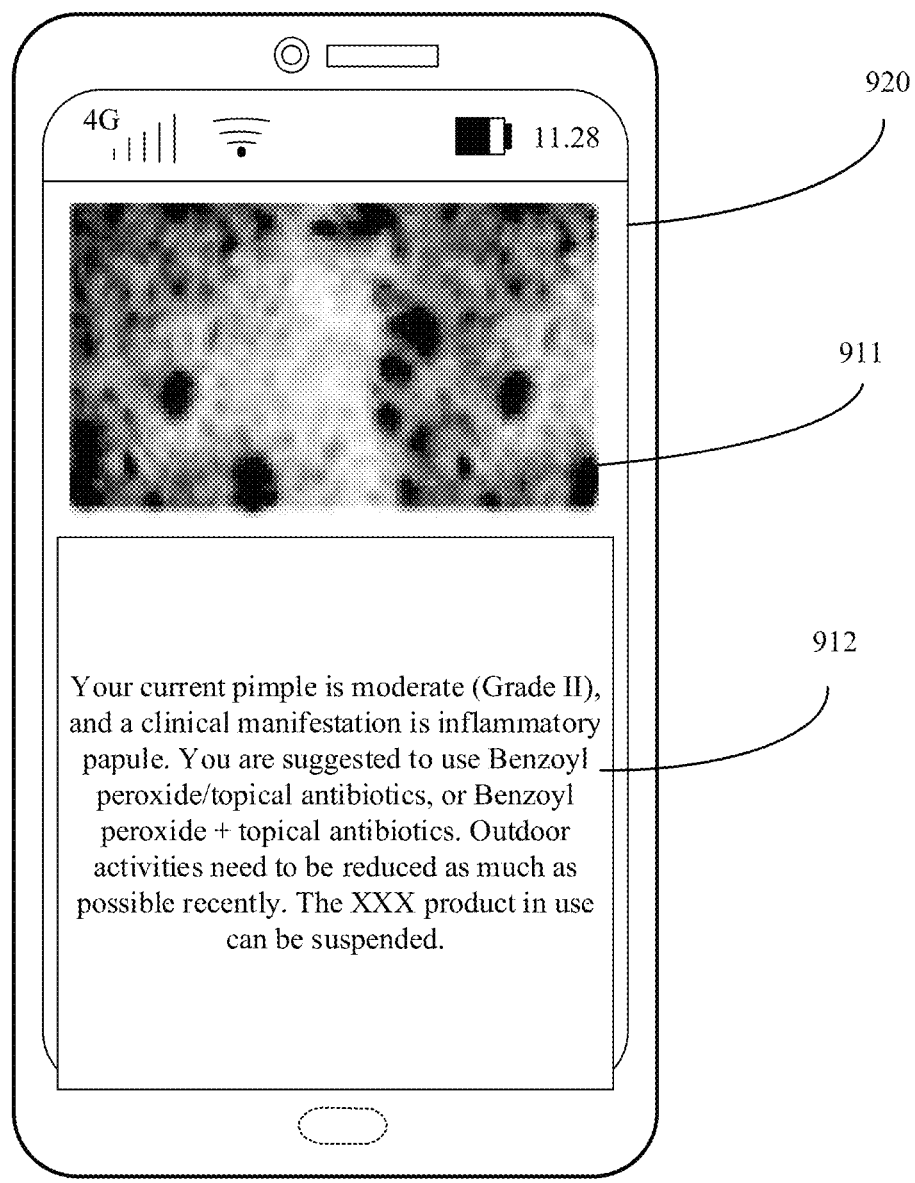
FIG. 9b is a schematic diagram of a user interface of a pimple detection result according to an embodiment of this application.

Refer to FIG. 9b. When the mobile phone is in the skin care mode, that the detection target is a pimple is used as an example. FIG. 9b is a schematic diagram of a user interface of a pimple detection result. As shown in FIG. 9b, the interface of the mobile phone displays an image of a pimple in an image display region 911. A corresponding description corpus is provided based on an image feature of the pimple, a personalized suggestion is provided with reference to health data, a living habit, and a to-be-used product, and a description corpus of care corresponding to the pimple is displayed in the knowledge point display region 912, for example. "Your current pimple is moderate (Grade II), and a clinical manifestation is inflammatory papule. You are suggested to use Benzoyl peroxide/topical antibiotics, or Benzoyl peroxide+topical antibiotics. Outdoor activities need to be reduced as much as possible recently. The XXX product in use can be suspended." If a large amount of content is described, the user may flip a page or slide downward a current page, to obtain a complete description.

Figure 9C:
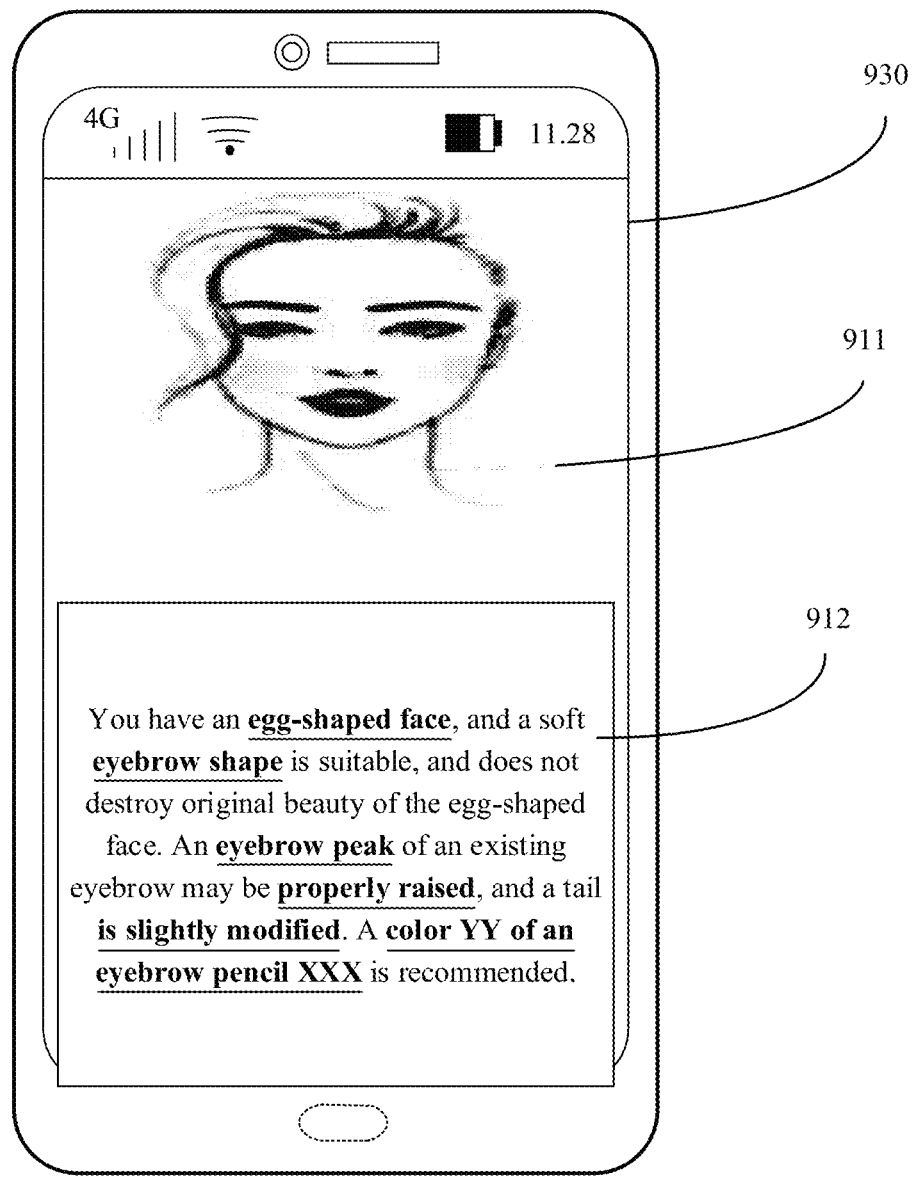
FIG. 9c is a schematic diagram of a user interface of an eyebrow detection result according to an embodiment of this application.

Refer to FIG. 9c. When the mobile phone is in the makeup mode, that the detection target is an eyebrow is used as an example. FIG. 9c is a schematic diagram of a user interface of an eyebrow detection result. As shown in FIG. 9c, an image display region 911 of an interface 930 displays a human face image of the user. The user may view an eyebrow, a face shape, and a contour of five facial features of the user based on the human face image. A specific face shape of the user in common face shapes may be first determined, a corresponding description corpus is provided based on the face shape and an eyebrow growth situation of the user, and a personalized suggestion is provided based on facial skin data, a makeup habit, and a to-be-used product. In addition, a makeup description corpus corresponding to the eyebrow is displayed in the knowledge point display region 912. For example, you have an egg-shaped face, and a soft eyebrow shape is suitable, and does not destroy original beauty of the egg-shaped face. An eyebrow peak of an existing eyebrow may be properly raised, and a tail is slightly modified. A color YY of an eyebrow pencil XXX is recommended."

Figure 10B:
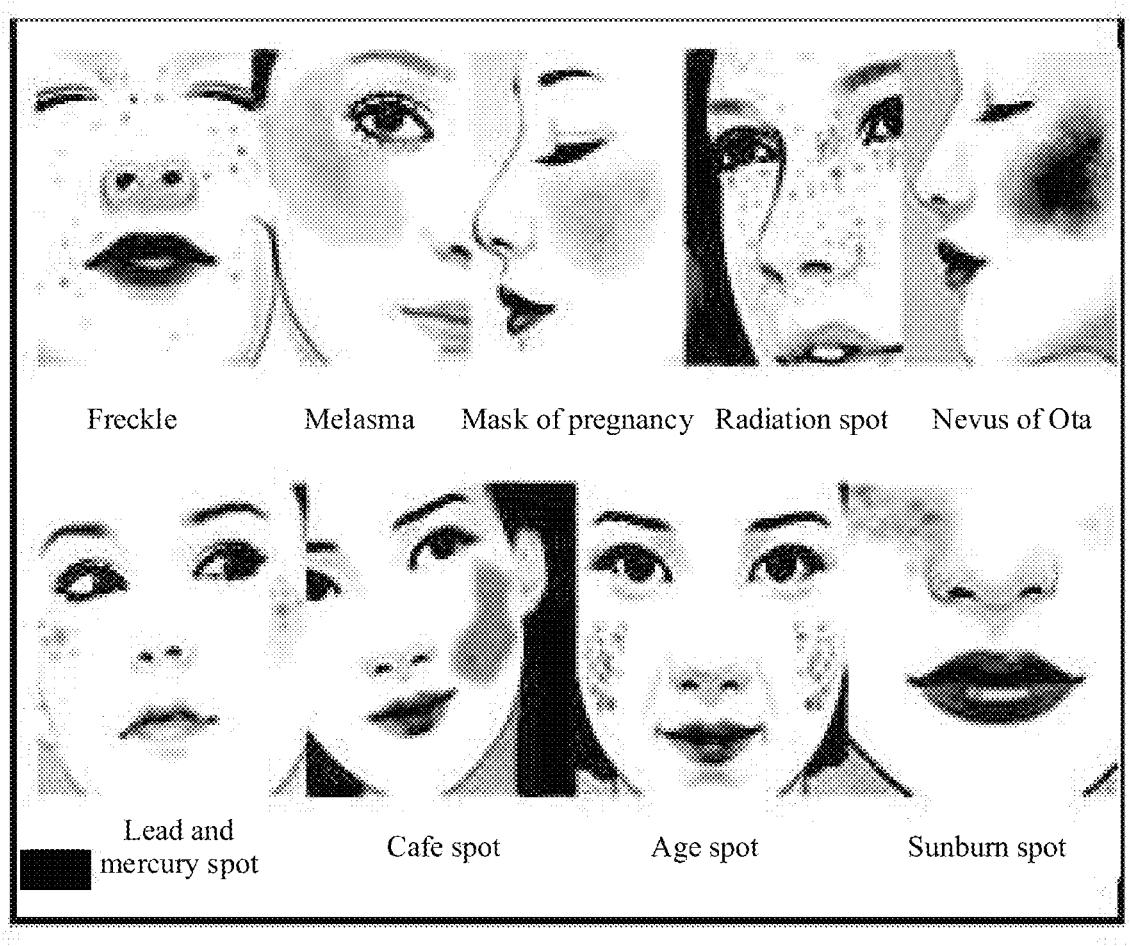
FIG. 10b is a schematic diagram of an image of stain types and a corresponding description corpus according to an embodiment of this application.

In addition, in some embodiments of this application, the image display region 911 and the knowledge point display region 912 may further display a diagnosis of the detection target as shown in FIG. 10a to FIG. 10d, and a pimple grade image and a corresponding description corpus shown in FIG. 10a. A pimple knowledge point in the extended content may include a professional classification of the pimple, and the pimple may be divided into four grades and three levels based on a shape, a size, and a color of the pimple. A professional term of the pimple in medicine is referred to as acne, and a specific classification is shown in Table 1:

TABLE 1

| | |
|---|---|
| Grade I acne | There is mainly a comedo and a small amount of papule nodules, and a total quantity of skin lesions is less than 30. |
| Grade II acne | There is a comedo and a medium amount of papule and pustules, and a total quantity of skin lesions is 31 to 50. |
| Grade III acne | There is a large quantity of papule and pustules, and a total quantity of skin lesions is 50 to 100. |
| Grade IV acne | There is nodular/cystic acne or aggregated acne, a total quantity of skin lesions is greater than 100, and a quantity of nodules/cysts is greater than 3. |

FIG. 10b shows an image of stain types. The stain types include a freckle, melasma, a mask of pregnancy, a radiation spot, a nevus of Ota, a lead and mercury spot, a cafe spot, an age spot, a sunburn spot, and the like.

Figure 10C:
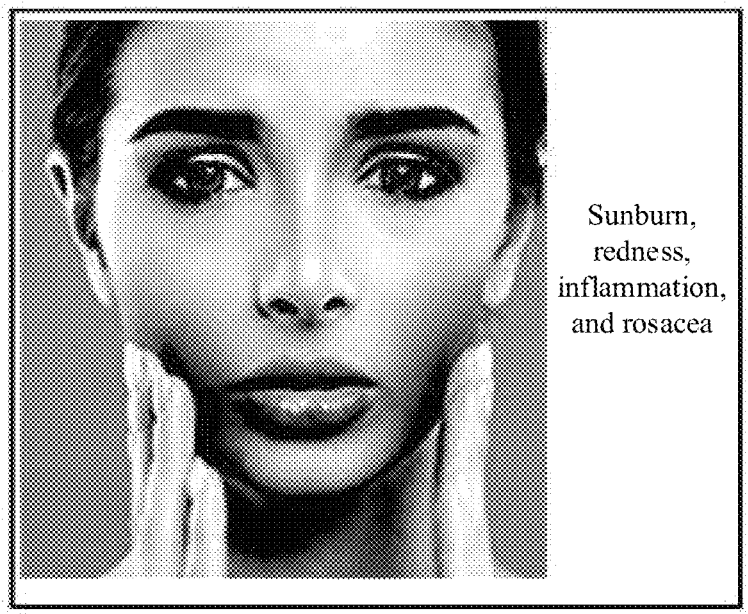
FIG. 10c is a schematic diagram of an image of a redness zone and a description corpus of a redness zone problem according to an embodiment of this application.

FIG. 10c shows a problem analysis and an image of a redness zone. The problem analysis may include: the redness zone belongs to sunburn, redness, inflammation, rosacea, or the like.

Figure 10D:
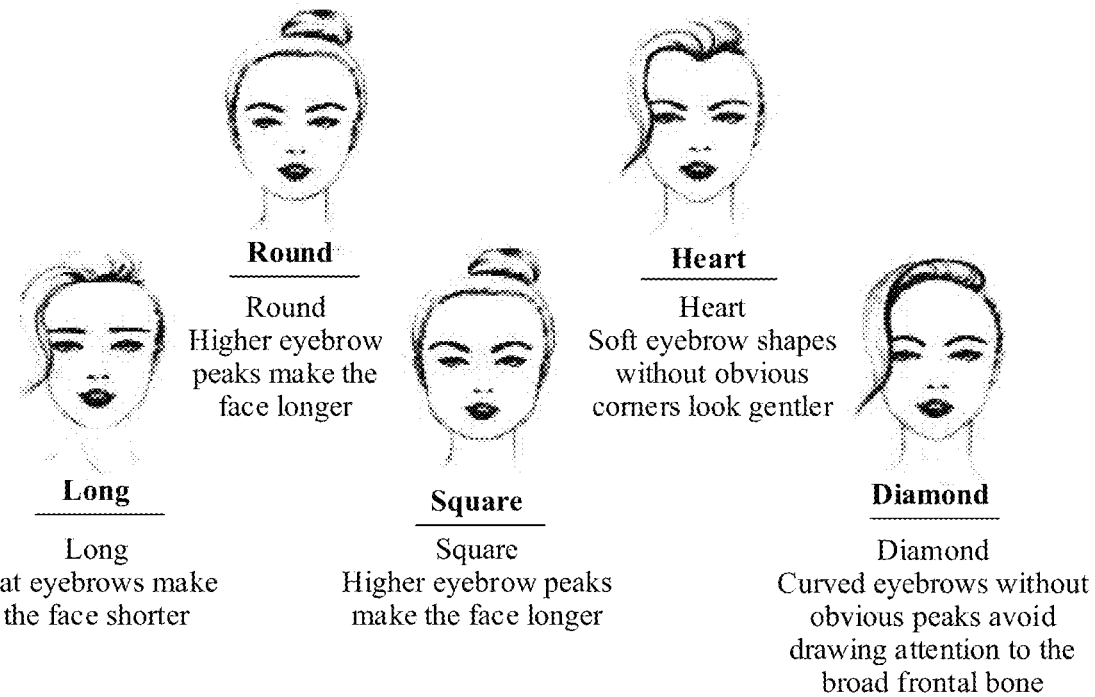
FIG. 10d is a schematic diagram of a makeup description corpus of eyebrow shapes corresponding to different face shapes according to an embodiment of this application.

FIG. 10d shows a makeup description corpus of eyebrow shapes corresponding to different face shapes, including a description of a face shape and a description corpus of an eyebrow shape to which the face shape is adapted.

Figure 10E:
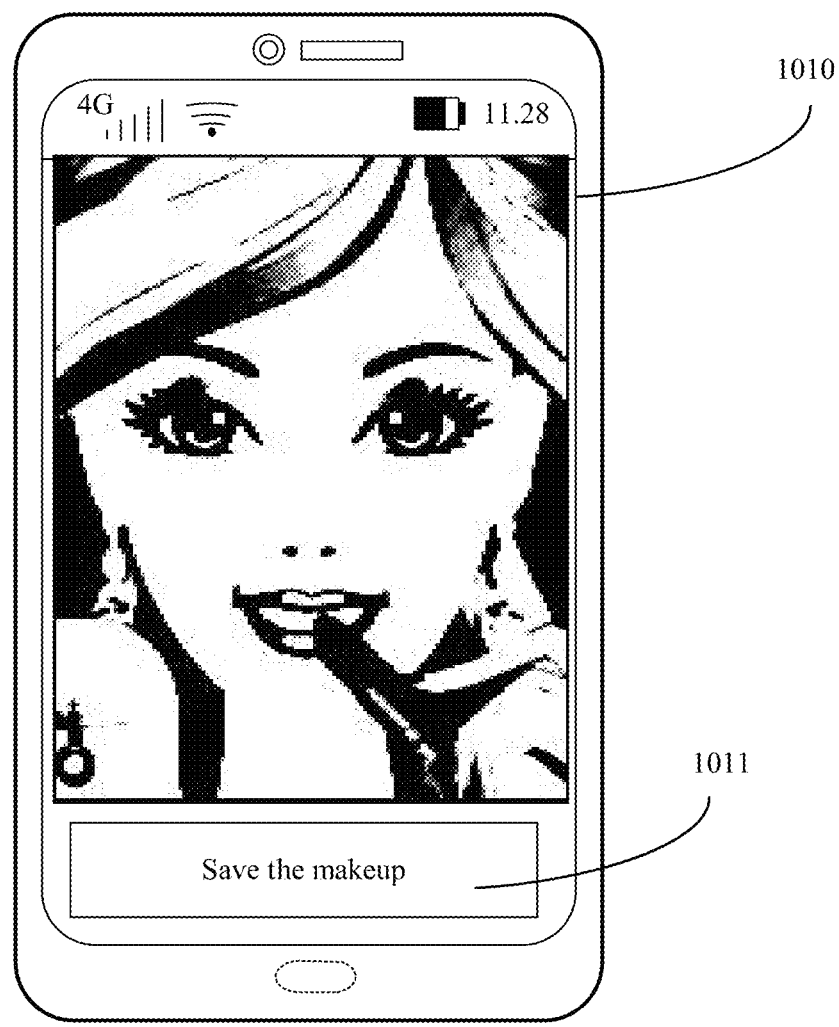
FIG. 10e is a schematic diagram of an interface that is of a face image of a user and that is displayed after virtual makeup according to some embodiments of this application.

In an embodiment of this application, when the user selects the makeup mode, after the user provides a makeup suggestion, an image of the user after makeup may be displayed to the user by using a virtual image, so that the user can learn of the image after makeup. Refer to FIG. 10e. An interface 1010 of the mobile phone may display a virtual face image of the user after makeup, and the user saves the virtual face image by using a save key 1011, so that the user intuitively feels an appearance after makeup, to improve user experience.

According to some embodiments of this application, a state analysis and a suggestion of the facial region of the user may be fed back to the user through voice-broadcasting, or displayed to a customer in a combination of interface display and voice-broadcasting, or the like. When it is inconvenient for the user to operate the mobile phone by using a hand when drawing an eyebrow, voice broadcasting further helps interaction with the user in an interaction method for a skin detection apparatus in this application.

Figure 11:
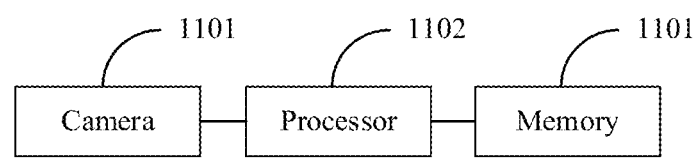
FIG. 11 is a schematic diagram of a structure of an electronic device according to an embodiment of this application.

Refer to FIG. 11. An embodiment of this application further provides an electronic device. An electronic device 1100 includes one or more memories 1101, one or more processors 1102 coupled to the memory 1101, at least one camera 1103 connected to the processor 1102, and one or more programs. The one or more programs are stored in the memory 1101, and the electronic device 1100 is configured to perform the following steps.

The camera 1103 obtains a plurality of video frames including both a face and a hand of a user.

The processor 1102 recognizes an action of the hand of the user relative to the face in the plurality of video frames, and determines a target hand action.

The processor 1102 determines a detection target in at least some regions on the face of the user in the video frame in response to the target hand action.

The processor 1102 determines, from an extended content library based on the detection target and a shape of the detection target, extended content associated with the detection target and the shape of the detection target, and outputs the extended content by using a display.

In an embodiment of this application, the determining a target hand action includes: The processor 1102 determines a hand action as the target hand action when determining that a distance between a location at which a fingertip of a finger is located and a location at which the face is located in the video frame is less than a preset distance.

In an embodiment of this application, the determining a target hand action includes:

The processor 1102 determines a hand action as the target hand action when determining that a distance between a location at which a fingertip of a finger is located and a location at which the face is located in the video frame is less than a preset distance, and determining that duration in which the finger is still relative to the face in the video frame is greater than a preset time period.

In an embodiment of this application, the determining a target hand action includes: The processor 1102 determines that a video includes two hands; and determines a band action as the target hand action when determining that a distance between a location at which fingertips of fingers of the two hands are located and a location at which the face is located in the video frame is less than a preset distance, and determining that duration in which the fingers of the two hands are still relative to the face in the video frame is greater than a preset time period.

In an embodiment of this application, when an amplitude of a relative motion of the finger relative to the face is less than a preset value, it is determined that the fingers of the two hands are still relative to the face in the video frame.

In an embodiment of this application, that the processor 1102 determines that a distance between a location at which the finger is located and the location at which the face is located in the video frame is less than the preset distance includes: a region of the location at which the finger of the user is located overlaps a region of the location at which the face is located in the video frame; or the finger does not overlap the face in the video frame, but a distance between the fingertip of the finger and an edge point that is of the face and that is closest to the fingertip of the finger is less than the preset distance.

In an embodiment of this application, that the processor 1102 determines a detection target in at least some regions on the face of the user in the video frame in response to the target hand action includes: determining, from at least one of the plurality of video frames, an intersection region between a region to which the finger points in the target hand action and a region in which the face is located, and determining the detection target in the intersection region.

In an embodiment of this application, the region to which the finger points is a geometric shape determined by using the fingertip of the finger as a reference point and by using, as a reference direction, a direction to which the finger points, and the geometric shape has a size and a contour that are preset by the user. The geometric shape includes any one of a trapezoid, a sector, a triangle, a circle, and a square.

In an embodiment of this application, the method includes: determining that the video includes the two hands, where the region to which the finger points is a geometric shape determined by using the fingertip of the finger as a reference point and by using, as a reference direction, a direction to which the finger points, and the geometric shape is a geometric shape preset by the user. An intersection set or a union set of regions to which the fingers of the two hands point is used as the region to which the finger points. The geometric shape includes any one of a trapezoid, a sector, a triangle, a circle, and a square.

In an embodiment of this application, the face includes at least one preset ROI region; and that the processor 1102 determines a detection target in at least some regions on the face of the user in the video frame in response to the target hand action further includes: determining, from the at least one of the plurality of video frames, an intersection region between the region to which the finger points in the target hand action and the ROI region included on the face, and determining the detection target in the intersection region.

In an embodiment of this application, when it is determined that the intersection region covers at least two ROI regions, the detection target is determined from an ROI region with a largest coverage area in the intersection region.

In an embodiment of this application, when it is determined that the intersection region covers at least two ROI regions, an image feature with a highest score in the ROI region is determined as the detection target based on a preset weight of the ROI region and a matching degree between an image feature of the ROI region and a feature standard model corresponding to the image feature.

In an embodiment of this application, when it is determined that the intersection region covers at least two ROI regions, the following is further included: The processor determines the detection target based on a first operation performed by the user on a detection target in the ROI region.

In an embodiment of this application, the detection target includes one or more skin states of a skin color, a pimple, a fine line, a pore, a blackhead, acne, a plaque, and redness, or the detection target includes one or more of a nose, a mouth, an eye, an eyebrow, a facial contour, and a skin color.

In an embodiment of this application, the plurality of video frames are a plurality of consecutive video frames within preset duration.

In an embodiment of this application, the method further includes: The electronic device 1102 obtains a real-time image of the user by using a camera 1103 of the electronic device, displays the real-time image of the user in a first interface, and obtains, from the real-time image, a video frame that has specified duration and that includes both the face and the hand of the user.

In an embodiment of this application, before the obtaining a plurality of video frames including both a face and a hand of a user, the following is further included: The electronic device determines, in response to an input operation performed by the user, to execute a makeup mode or a skin care mode.

In an embodiment of this application, that the electronic device 1100 outputs the extended content includes: A display displays a second interface, where the second interface includes the detection target determined based on the target hand action and the extended content corresponding to the shape of the detection target: or a speaker voice-broadcasts the detection target determined based on the target hand action and the extended content corresponding to the shape of the detection target.

In an embodiment of this application, the extended content includes: one or more of a problem analysis and a care suggestion of the detection target in a skin care state, or one or more of a makeup state analysis and a makeup suggestion of the detection target in a makeup state.

In this application, each component of the electronic device 1101 and an operating process of each component have been described in detail in the foregoing embodiments. For details, refer to the interaction method for an electronic device for skin detection in FIG. 1 to FIG. 10*e*. Details are not described herein again.

An embodiment of this application further provides a computer-readable storage medium. The computer-readable storage medium stores a computer program. When the computer program is run by a processor, the processor performs the interaction method for an electronic device for skin detection in FIG. 1 to FIG. 10*e*.

An embodiment of this application further provides a computer program product including instructions. When the computer program product runs on an electronic device, a processor is enabled to perform the interaction method for an electronic device for skin detection in FIG. 1 to FIG. 10*e*.

Figure 12:
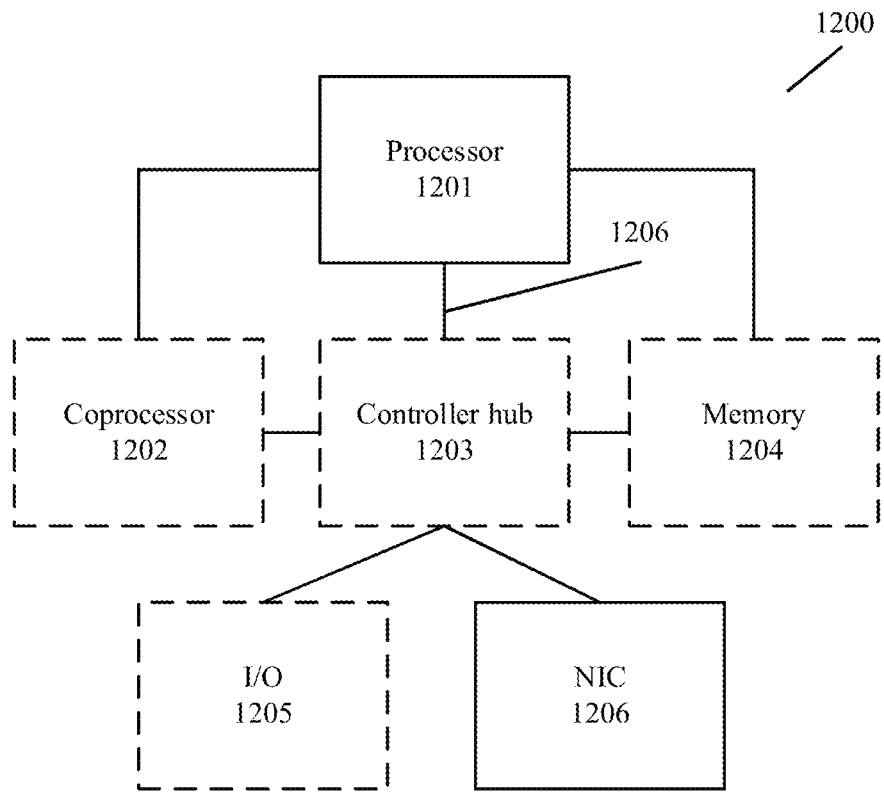
FIG. 12 is a block diagram of a device according to an embodiment of this application.

Refer to FIG. 12 now. FIG. 12 is a block diagram of a device 1200 according to an embodiment of this application. The device 1200 may include one or more processors 1201 coupled to a controller hub 1203. In at least one embodiment, the controller hub 1203 communicates with the processor 1201 through a plurality of branch buses such as a front side bus (Front Side Bus, FSB), a point-to-point interface such as a quick path interconnect (Quick Path Interconnect, QPI), or a similar connection 1206. The processor 1201 executes an instruction for controlling a general type of data processing operation. In an embodiment, the controller hub 1203 includes but is not limited to a graphics memory controller hub (Graphics Memory Controller Hub. GMCH) (not shown) and an input/output hub (Input Output Hub, IOH) (the input/output hub may be on separate chips) (not shown). The GMCH includes a memory and a graphics controller, and is coupled to the IOH.

The device 1200 may further include a coprocessor 1202 and a memory 1204 coupled to the controller hub 1203. Alternatively, one or both of the memory and the GMCH may be integrated into the processor (as described in this application). The memory 1204 and the coprocessor 1202 are directly coupled to the processor 1201 and the controller hub 1203, and the controller hub 1203 and the IOH are on a single chip. The memory 1204 may be, for example, a dynamic random access memory (Dynamic Random Access Memory, DRAM), a phase change memory (Phase Change Memory, PCM), or a combination thereof. In an embodiment, the coprocessor 1202 is a dedicated processor, for example, a high throughput MIC processor (Many Integrated Core, MIC), a network or communications processor, a compression engine, a graphics processor, a general-purpose graphics processing unit (General Purpose Computing on GPU, GPGPU), or an embedded processor. An optional property of the coprocessor 1202 is indicated by using a dashed line in FIG. 12.

As a computer-readable storage medium, the memory 1204 may include one or more tangible and non-transitory computer-readable media configured to store data and/or instructions For example, the memory 1204 may include any proper nonvolatile memory such as a flash memory and/or any proper nonvolatile storage device such as one or more hard disk drives (Hard-Disk Drive, HDD(s)), one or more compact disc (Compact Disc. CD) drives, and/or one or more digital versatile disc (Digital Versatile Disc, DVD) drives.

In an embodiment, the device 1200 may further include a network interface (Network Interface Controller, NIC) 1206. The network interface 1206 may include a transceiver, configured to provide a radio interface for the device 1200 to communicate with any other proper device (for example, a front-end module or an antenna). In various embodiments, the network interface 1206 may be integrated with another component of the device 1200. The network interface 1206 may implement a function of a communications unit in the foregoing embodiments.

The device 1200 may further include an input/output (Input/Output, I/O) device 1205. The I/O 1205 may include a user interface. Based on this design, a user can interact with the device 1200. An interface of a peripheral component is designed, so that the peripheral component can also interact with the device 1200; and/or a sensor is designed to determine an environmental condition and/or location information associated with the device 1200.

It should be noted that FIG. 12 is only an example. In other words, although FIG. 12 shows that the device 1200 includes a plurality of components such as the processor 1201, the controller hub 1203, and the memory 1204, in an actual application, the device using the method in this application may include only some of the components of the device 1200, for example, may include only the processor 1201 and the NIC 1206. A property of an optional component in FIG. 12 is shown by using a dashed line.

In some embodiments of this application, as a computer-readable storage medium, the memory 1204 stores instructions. When the instructions are executed on a computer, a system 1200 is enabled to perform the calculation method in embodiments. For details, refer to the interaction method for an electronic device for skin detection shown in FIG. 1 to FIG. 10*e* in the foregoing embodiments. Details are not described herein again.

Figure 13:
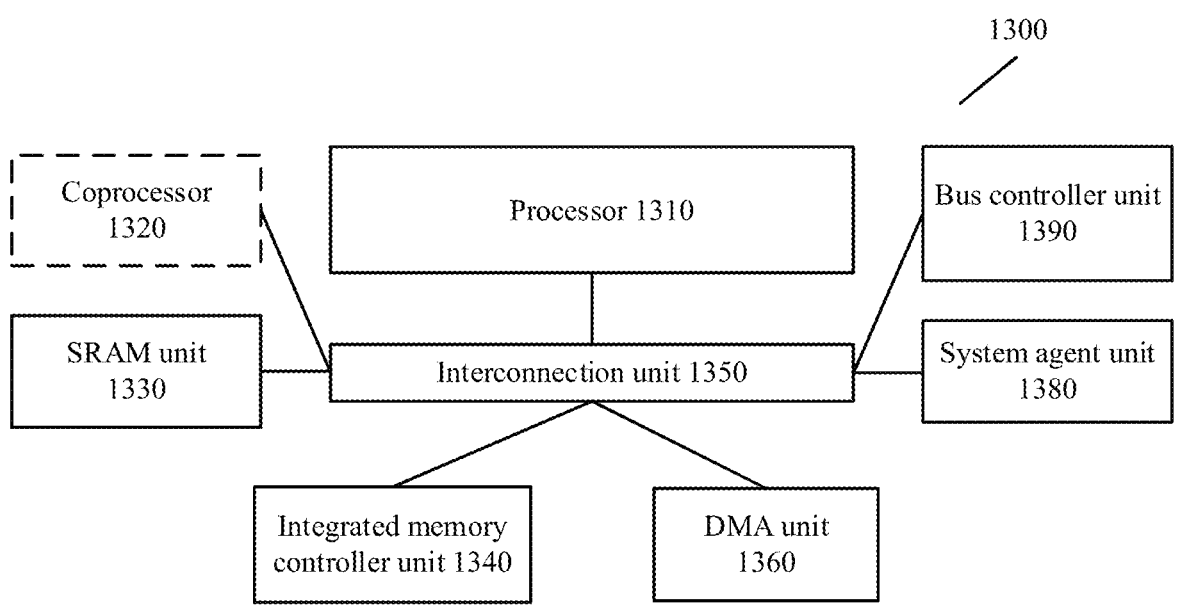
FIG. 13 is a block diagram of an SoC according to an embodiment of this application.

Refer to FIG. 13 now. FIG. 13 is a block diagram of an SoC (System on Chip, System on Chip) 1300 according to an embodiment of this application. In FIG. 13, similar parts have a same reference numeral. In addition, a dashed box is an optional feature of a more advanced SoC. In FIG. 13, the SoC 1300 includes an interconnection unit 1350, where the interconnection unit 1350 is coupled to an application processor 1310; a system agent unit 1380: a bus controller unit 1390; an integrated memory controller unit 1340, a group of or one or more coprocessors 1320, where the group of or one or more coprocessors 1320 may include integrated graphics logic, an image processor, an audio processor, and a video processor: a static random access memory (Static Random Access Memory, SRAM) unit 1330, and a direct memory access (DMA) unit 1360. In an embodiment, the coprocessor 1320 includes a dedicated processor, for example, a network or communications processor, a compression engine, a GPGPU, a high throughput MIC processor, or an embedded processor.

In one embodiment, the static random access memory (SRAM) unit 1330 may include one or more computer-readable mediums used to data and/or instructions. The computer-readable storage medium may store instructions, specifically, a transitory and permanent copy of the instructions. The instructions may include: when the instructions are executed by at least one unit in the processor, the SoC 1300 is enabled to perform the interaction method for an electronic device for skin detection in FIG. 1 to FIG. 10e in the foregoing embodiments. For details, refer to the method in the foregoing embodiments. Details are not described herein again.

Embodiments of a mechanism disclosed in this application may be implemented in hardware, software, firmware, or a combination of these implementation methods. Embodiments of this application may be implemented as a computer program or program code executed on a programmable system. The programmable system includes at least one processor and a storage system (including a volatile and nonvolatile memory and/or a memory element), at least one input device, and at least one output device.

Program code may be applied to an input instruction, to perform each function described in this application and generate output information. The output information may be applied to one or more output devices in a known manner. For a purpose of this application, a processing system includes any system including a processor such as a digital signal processor (Digital Signal Processor, DSP), a microcontroller, an application-specific integrated circuit (Application Specific Integrated Circuit, ASIC), or a microprocessor.

The program code may be implemented by using a high-level programming language or an object-oriented programming language, to communicate with the processing system. The program code may also be implemented by using an assembly language or a machine language when there is a requirement. In fact, the mechanism described in this application is not limited to a scope of any specific programming language. In either case, the language may be a compiled language or an interpreted language.

In some cases, the disclosed embodiments may be implemented in hardware, firmware, software, or any combination thereof. The disclosed embodiments may also be implemented as instructions carried or stored in one or more transitory or non-transitory machine-readable (namely, computer-readable) storage media, and the instructions may be read and executed by one or more processors. For example, the instructions may be distributed over a network or by using another computer-readable medium Therefore, the machine-readable medium may include any mechanism of storing or transmitting information in a machine (namely, computer)-readable form, including but not limited to a floppy disk, a compact disc, an optical disc, a compact disc read-only memory (Compact Disc Read Only Memory, CD-ROMs), a magneto-optical disk, a read-only memory (Read Only Memory, ROM), a random access memory (RAM), an erasable programmable read only memory (Erasable Programmable Read Only Memory. EPROM), an electrically erasable programmable read-only memory (Electrically Erasable Programmable Read Only Memory, EEPROM), a magnetic card or an optical card, a flash memory, or a tangible machine-readable memory that transmits information (for example, a carrier, an infrared signal, or a digital signal) in an electrical form, an optical, an acoustic form, or another form via the internet. Therefore, the machine-readable medium includes any type of machine-readable medium suitable for storing or transmitting an electronic instruction or information in a machine (namely, computer)-readable form.

In the accompanying drawings, some structural or method features may be shown in a specific arrangement and/or sequence. However, it should be understood that such a specific arrangement and/or sequence may not be required. Instead, in some embodiments, the features may be arranged in a manner and/or sequence different from that shown in the accompanying drawings of the specification. In addition, inclusion of the structural or method features in a specific diagram does not imply that such features are required in all embodiments. In some embodiments, these features may not be included or may be combined with another feature.

It should be noted that, each unit/module mentioned in the device embodiments of this application is a logical unit/module. Physically, one logical unit/module may be one physical unit/module, or may be a part of one physical unit/module, or may be implemented by using a combination of a plurality of physical units/modules. A physical implementation of the logical unit/module is not the most important. A combination of functions implemented by the logical unit/module is a key to resolving the technical problem provided in this application. In addition, to highlight an innovative part of this application, a unit/module that is not closely related to a resolution of the technical problem provided in this application is not introduced in the device embodiments of this application. It does not indicate that there is no another unit/module in the device embodiments.

It should be noted that in this specification, relational terms such as first and second are only used to distinguish one entity or operation from another, and do not necessarily require or imply that any actual relationship or sequence exists between these entities or operations. Moreover, the terms "include" or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

Although this application has been illustrated and described with reference to some preferred embodiments of this application, a person of ordinary skill in the art should understand that various changes may be made to a form and a detail without departing from the spirit and scope of this application.

What is claimed is:

1. A method implemented by an electronic device wherein the method comprises:
    obtaining video frames comprising a face of a user and a hand of the user;
    recognizing a hand action of the user relative to the face in the video frames;
    determining, in response to recognizing the hand action, a target hand action;
    determining, from the at least one of the video frames, a first intersection region between a first region to which a finger of the user points in the target hand action and a second region in which the face is located;
    determining a detection target in the first intersection region;
    determining a geometric shape of the first region using a fingertip of the finger as a reference point and a direction to which the finger points as a reference direction, wherein the geometric shape has a size and a contour that are preset by the user;

determining, from an extended content library and based on the detection target and a shape of the detection target, extended content associated with the detection target and the shape;

outputting the extended content;

obtaining a real-time image of the user using a camera of the electronic device;

displaying the real-time image in a first interface of the electronic device; and obtaining, from the real-time image, a video frame that comprises both the face and the hand.

2. The method of claim 1, wherein determining the target hand action comprises determining the hand action as the target hand action when a distance between a first location at which the fingertip is located and a second location at which the face is located in the at least one of the video frames is less than a preset distance.

3. The method of claim 1, wherein determining the target hand action comprises determining the hand action as the target hand action when a first distance between a first location at which the fingertip is located and a second location at which the face is located in the at least one of the video frames is less than a preset distance and when a second duration in which the finger is still relative to the face in the at least one of the video frames is greater than a preset time period.

4. The method of claim 3, further comprising:
identifying that an amplitude of a relative motion of the finger relative to the face is less than a preset value; and
determining, in response to identifying that the amplitude is less than the preset value, that the finger is still relative to the face in the at least one of the video frames.

5. The method of claim 3, further comprising determining that the first distance is less than the preset distance when:
a third region of the first location overlaps a fourth region of the second location; or
the finger does not overlap the face in the at least one of the video frames and a second distance between the fingertip and an edge point of the face proximate to the fingertip is less than the preset distance.

6. The method of claim 1, wherein determining the target hand action comprises:
determining that the video frames comprise two hands; and
determining the hand action as the target hand action when a distance between a first location at which fingertips of fingers of the two hands are located and a second location at which the face is located in the at least one of the video frames is less than a preset distance and when a second duration in which the fingers are still relative to the face in the at least one of the video frames is greater than a preset time period.

7. The method of claim 1, further comprising:
determining that the video frames comprise two hands; and
setting an intersection set or a union set of regions to which fingers of the two hands point as the first region.

8. The method of claim 1, wherein the geometric shape comprises any one of a trapezoid, a sector, a triangle, a circle, or a square.

9. The method of claim 1, wherein the face comprises at least one preset region of interest (ROI), and wherein determining the detection target further comprises:

determining, from the at least one of the video frames, a second intersection region between the first region and the at least one preset ROI; and
determining the detection target in the second intersection region.

10. The method of claim 9, further comprising:
determining that the second intersection region covers at least two ROIs; and
determining, in response to determining that the second intersection region covers the at least two ROIs, the detection target from an ROI of the at least two ROIs with a largest coverage area in the second intersection region.

11. The method of claim 9, further comprising:
determining that the second intersection region covers at least two ROIs; and
determining, in response to determining that the second intersection region covers the at least two ROIs, an image feature with a highest score in an ROI of the at least two ROIs that is based on a preset weight of the ROI and a matching degree between the image feature and a feature standard model corresponding to the image feature as the detection target.

12. The method of claim 9, further comprising:
determining that the second intersection region covers at least two ROIs; and
determining, in response to determining that the second intersection region covers the at least two ROIs, the detection target based on a first operation performed by the user on a second detection target in an ROI of the at least two ROIs.

13. The method of claim 1, wherein the detection target comprises one or more skin states of a skin color, a pimple, a fine line, a pore, a blackhead, acne, a plaque, or redness, or one or more of a nose, a mouth, an eye, an eyebrow, a facial contour, or the skin color.

14. The method of claim 1, wherein the video frames comprise consecutive video frames within a preset duration.

15. The method of claim 1, wherein before obtaining the video frames, the method further comprises determining, in response to an input operation of the user, to execute a makeup mode or a skin care mode.

16. The method of claim 1, wherein outputting the extended content comprises:
displaying a second interface comprising the detection target; or
voice-broadcasting the detection target.

17. The method of claim 1, wherein the extended content comprises:
one or more of a problem analysis or a care suggestion of the detection target in a skin care state; or
one or more of a makeup state analysis or a makeup suggestion of the detection target in a makeup state.

18. An electronic device comprising:
a memory configured to store instructions; and
a processor coupled to the memory and configured to execute the instructions to cause the electronic device to:
obtain video frames comprising a face of a user and a hand of the user;
recognize a hand action of the user relative to the face in the video frames;
determine, in response to recognizing the hand action, a target hand action;
determine, from the at least one of the video frames, a first intersection region between a first region to which a finger of the user points in the target hand action and a second region in which the face is located;

determine a detection target in the first intersection region;

determine a geometric shape of the first region using a fingertip of the finger as a reference point and a direction to which the finger points as a reference direction, wherein the geometric shape has a size and a contour that are preset by the user;

determine, from an extended content library and based on the detection target and a shape of the detection target, extended content associated with the detection target and the shape;

output the extended content;

obtain a real-time image of the user using a camera of the electronic device;

display the real-time image in an interface of the electronic device; and obtain, from the real-time image, a video frame that comprises both the face and the hand.

\* \* \* \* \*